United States Patent [19]

Hirayama et al.

[11] 4,122,462

[45] Oct. 24, 1978

[54] IMAGE INFORMATION RECORDING APPARATUS

[75] Inventors: Kazuhiro Hirayama, Yokohama; Yasushi Sato, Kawasaki; Noritaka Mochizuki, Yokohama; Katsumi Masaki, Kodaira, all of Japan

[73] Assignee: Canon Kabushiki Kaisha, Tokyo, Japan

[21] Appl. No.: 850,384

[22] Filed: Nov. 10, 1977

Related U.S. Application Data

[63] Continuation of Ser. No. 611,783, Sep. 9, 1975, abandoned.

[30] Foreign Application Priority Data

Sep. 11, 1974 [JP] Japan ............................... 49-104738
Sep. 13, 1974 [JP] Japan ............................... 49-105631
Oct. 1, 1974 [JP] Japan ............................... 49-112925
Jan. 24, 1975 [JP] Japan ............................... 50-10286

[51] Int. Cl.$^2$ ............... B41B 13/00; G03G 15/00; G01D 9/42
[52] U.S. Cl. ......................... 354/5; 355/3 R; 250/199; 346/108; 358/285; 358/300
[58] Field of Search ................ 355/3 R, 39, 40, 43, 355/79; 250/199; 346/108, 153, 160; 358/300, 285, 286, 258; 354/5, 7

[56] References Cited

U.S. PATENT DOCUMENTS

| | | | |
|---|---|---|---|
| 3,165,024 | 1/1965 | McClure | 355/40 |
| 3,535,036 | 10/1970 | Starkweather | 355/3 R |
| 3,642,370 | 2/1972 | Meredith et al. | 355/79 |
| 3,659,936 | 5/1972 | Klose et al. | 355/3 R |
| 3,677,146 | 7/1972 | Nielson | 355/39 |
| 3,752,992 | 8/1973 | Fluhr | 250/199 |
| 3,797,927 | 3/1974 | Taisahashi et al. | 355/3 R |
| 3,872,462 | 3/1975 | Lemelson | 355/3 R |
| 3,917,396 | 11/1975 | Donohue et al. | 355/14 |

*Primary Examiner*—Michael L. Gellner
*Attorney, Agent, or Firm*—Fitzpatrick, Cella, Harper & Scinto

[57] ABSTRACT

In an image information recording apparatus, wherein a light beam is modulated by an information signal to effect recording on a recording medium, there is provided a light beam forming unit, a light beam modulator for modulating the formed light beam in accordance with an image information signal to produce first image information, an image forming lens for focussing the modulated light beam upon the recording medium, a recording medium sensitizer, a scanner for scanning the modulated light beam over the recording medium and additional image information which is overlaid on the first image information to produce an overlaid image on the recording medium.

29 Claims, 60 Drawing Figures

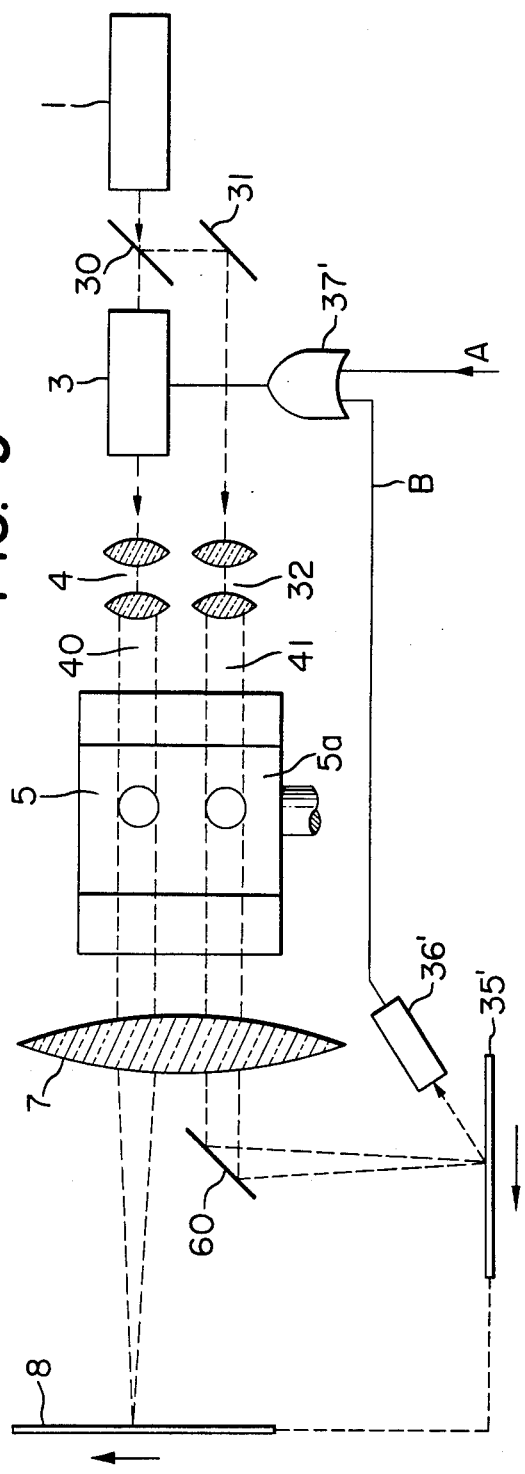
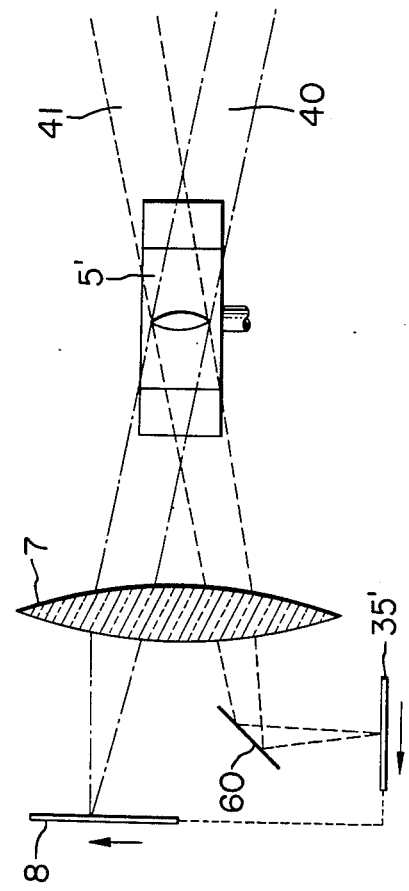
FIG. 9
FIG. 10

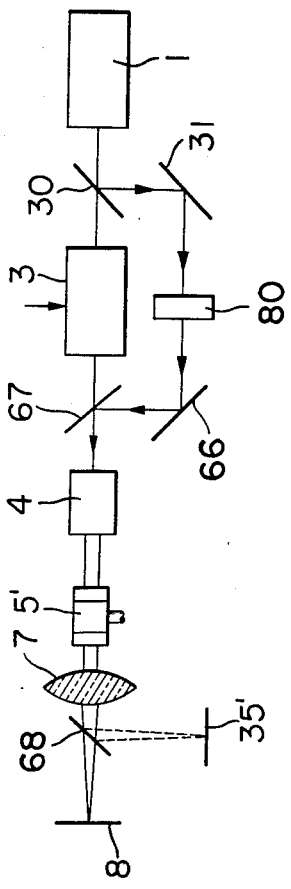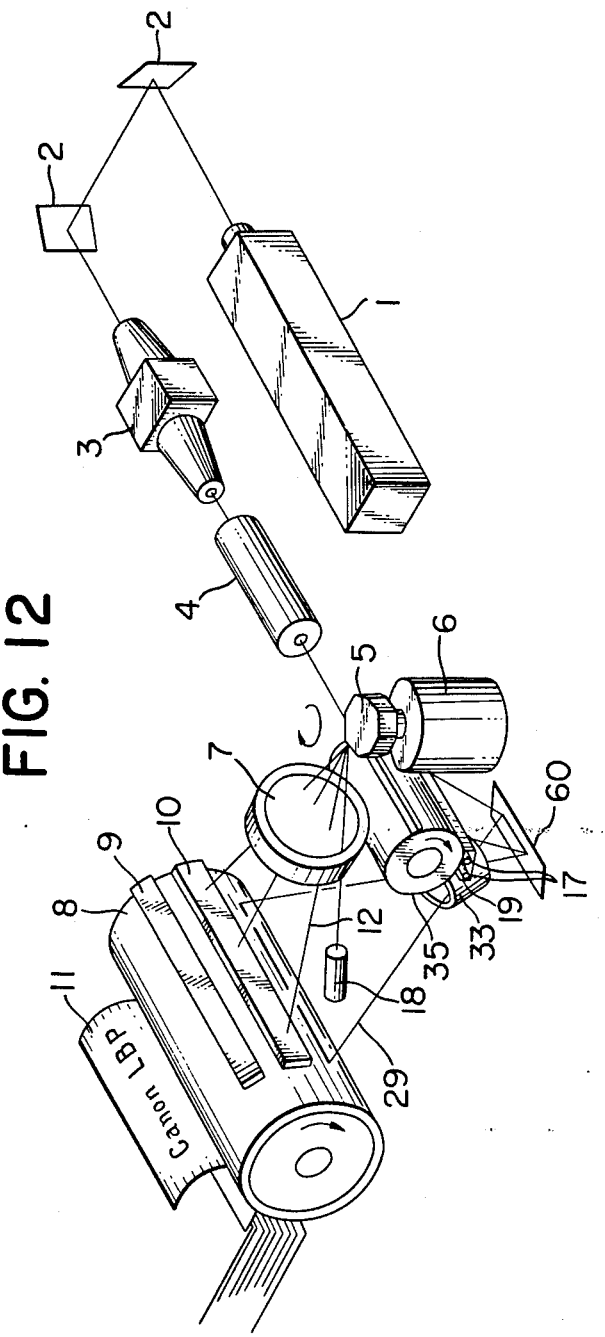

AD  AL    BD  BL

FIG. 25
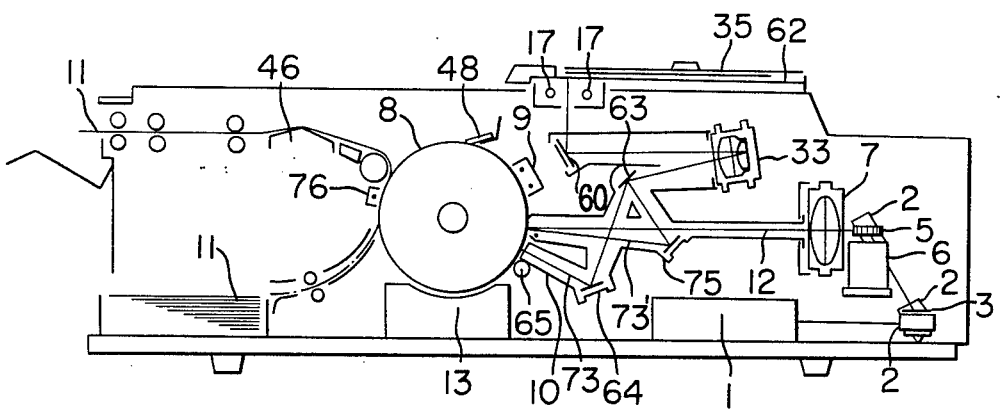
| FIG. 26(a) | FIG. 26(b) | FIG. 26(c) | FIG. 26(d) |
|---|---|---|---|
| 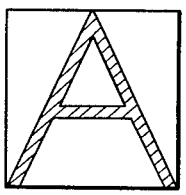 | 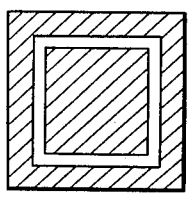 | 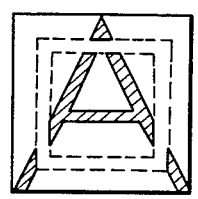 | 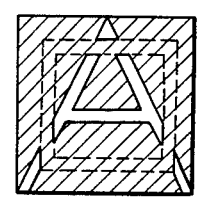 |
| FIG. 27(a) | FIG. 27(b) | FIG. 27(c) | FIG. 27(d) |
|---|---|---|---|
| 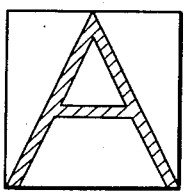 | 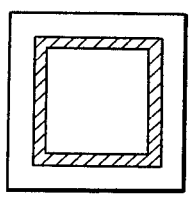 | 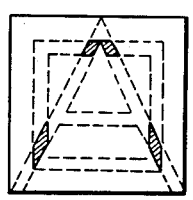 | 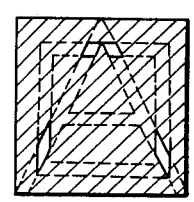 |
| FIG. 28(a) | FIG. 28(b) | FIG. 28(c) | FIG. 28(d) |
|---|---|---|---|
| 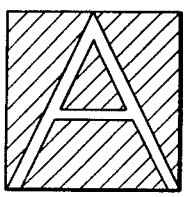 | 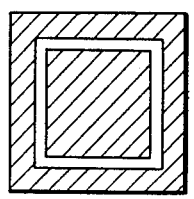 | 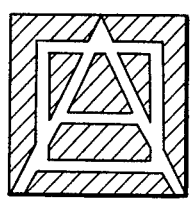 | 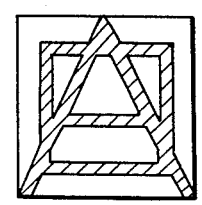 |

IMAGE INFORMATION RECORDING APPARATUS

This is a continuation of application Ser. No. 611,783 filed Sept. 9, 1975, now abandoned.

BACKGROUND OF THE INVENTION

1. Field of the Invention

This invention relates to an image information recording apparatus, in which a light beam is modulated by an extraneous signal to form an information pattern, and this information pattern is recorded on a recording medium. More particularly, it relates to an image information recording apparatus for recording a plurality of different types of information from different information sources on a recording medium in a superposed relationship.

The present invention will thus be effective in modulating light beams such as laser light, etc. (hereinafter referred to simply as a first and a second light beam, although they may be more than two beams) by character or pattern information (first information) signal from an electronic computer, etc. so as to be rendered into an image information pattern, and in recording another image information pattern such as a record format (the second information) pattern being different from the first information pattern simultaneously overlayed on the first information pattern.

2. Description of the Prior Art

Necessity often arises for recording information from an electronic computer, etc. in accordance with a prescribed format. In such cases, it has heretofore been the practice to pre-print sheets of recording paper with that format and record the output information from the computer, etc. on these preprinted recording sheets. Such a conventional method, however, has involved the necessity for pre-printing the recording sheets with the format which may include character frame, ruled lines, ornamental patterns, fixed character information, etc., and, once printed, the format could not easily be altered. Further, selection of a format suited for the content of an information pattern has involved the cumbersome procedure of exchanging the recording paper pre-printed with a desired format. When a unit electronic computer is used for multiple purposes to obtain various types of output information, it is inconvenient from the stand point of high-speed printing of the information that recording sheets having a different format for each type of information pattern should be change.

SUMMARY OF THE INVENTION

It is an object of the present invention to eliminate all the above-noted disadvantages peculiar to the prior art, and to provide such a recording apparatus as will hereinafter be described for recording a plurality of different kinds of information from different information sources by the use of a plurality of light beams such as laser light, etc.

That is, the present invention provides an apparatus, in which a light beam is modulated by an information signal and recorded on a sensitive recording medium, and in which, for recording a plurality of different kinds of information from different information sources, there is formed, for example, first and second light beams, of which the second light beam is made into a signal by a second information source, and such signal is synthesized with a signal from a first information source to modulate the first light beam, thereafter the synthesized signal is used to modulate the first light beam and, the thus modulated image information is recorded on the recording medium.

It is also an object of the present invention to provide an apparatus for recording image information from a plurality of different information sources, and which comprises first and second information sources, first and second light beam forming means, means for deflecting the first and the second light beams in synchronism with each other, means for modulating the first light beam by a signal from the first information source, means corresponding to the second information source and for generating a signal in response to the input of the deflected second light beam means for synthesizing such signal and a signal from the first information source, and means for recording the first light beam after the modulation, whereby the first and the second information pattern may be recorded in an overlaid manner.

It is another object of the present invention to provide an image information recording apparatus, wherein, by the use of optical overlay means, any format can be easily recorded simultaneously with the information recording, and the exchange of the format can be done simply and quickly by causing a drum carrying thereon a plurality of formats axially slidable with respect to each other, or by interchanging the format drum, or by replacement of the master paper or master film for the format. If a polarization beam splitter is used for such optical overlay, the transmission factor of the laser beam can be improved, so that the recording speed may become higher than in the case when a conventional beam splitter is used, and the use of a light beam oscillator such as a low output beam oscillator, etc. becomes possible.

It is a further object of the present invention to provide an image information recording apparatus, wherein a laser beam is deflected and modulated by an output information from an electronic computer, and the information is image-formed on a sensitive recording medium, while, at the same time, an image reflected by or transmitted through a master film or the like providing a desired format is optically synthesized with the abovementioned laser beam and subjected to light exposure, whereby the two kinds of image information may be recorded at a high speed to provide a hard copy of high quality with the aid of a suitable optical recording means, for example, the electrophotographic process as disclosed in Japanese Patent Publication No. 23910/1967 corresponding to U.S. Pat. No. 3,666,363.

According to one aspect of the present invention, there is provided an image information recording apparatus, in which a light beam is modulated by an information signal to effect recording of the image information on a recording medium, and which comprises light beam forming means, means for modulating the light beam from the light beam forming means in accordance with the image information, image-forming lens means for focussing the light beam from the modulator means on the recording medium, means for synthesizing the recording medium, means for causing the modulated light beam to scan over the recording medium, and means for overlaying the abovementioned image information and other image information with respect to the recording medium.

According to another aspect of the present invention, there is provided an image information recording apparatus, in which a light beam is modulated by an information signal to effect recording of the image information on a recording medium, and which comprises first and second light beam forming means including a beam splitter for splitting the light beam or beams from one or two laser oscillators, modulator means capable of modulating the light beam from the first light beam forming means in accordance with a first image information signal, means for deflecting the first and second light beams in synchronism with each other, a second image information carrier to be scanned by the second light beam deflected by the deflector means, means for overlaying the signal from the second image information souce upon the the first image information pattern, and image-forming lens means for focussing upon the recording medium the first light beam modulated in the modulator means by the signal from the overlay means.

According to a further aspect of the present invention there is provided an image information recording apparatus, wherein a primary electric charging is carried out upon the surface of an insulating layer of an electrophotographic sensitive medium consisting essentially of an electrically conductive substrate, a photoconductive layer, and an electrically insulative layer, then a first light image of a laser beam deflected and modulated by an extraneous signal is caused to scan over the insulating layer for exposure, and simultaneously with, or prior to, or subsequent to the scanning, AC corona discharge, or secondary corona discharge having an opposite polarity to that of the primary charge is applied to the insulating layer, and further a second light image exposure is effected in synchronism with the first light image exposure position to form an electrostatic latent image of a synthesized image.

The foregoing objects and other objects as well as the detailed construction and operations of the present invention will become more fully apparent from the following detailed description of the preferred embodiments of the invention taken in conjunction with the accompanying drawings.

BRIEF DESCRIPTION OF THE DRAWINGS

In the drawings:

FIG. 9 is a schematic block diagram corresponding to and representative of the secondary image projecting means shown in FIG. 4;

FIG. 10 illustrates a modification of an essential part of the construction shown in FIG. 9;

FIG. 11 is a block diagram of another modification of the essential part of the construction shown in FIG. 9;

FIG. 12 is a perspective view of a further embodiment of the present invention;

FIGS. 24 and 25 are respectively perspective view and cross-sectional side elevational view showing another embodiment of the present invention; and FIGS. 26(a) through 28(d) inclusive show various forms of the image synthesis in the first exposure.

DESCRIPTION OF THE PREFERRED EMBODIMENTS

Several preferred embodiments of the present invention will hereinafter be described in detail with reference to the drawings.

Figure 1:
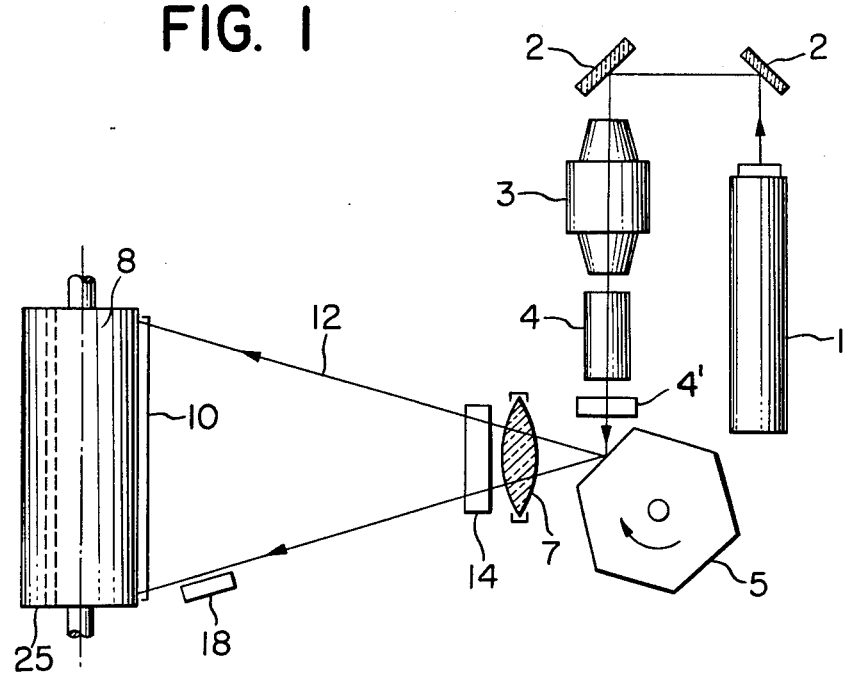
FIG. 1 is a top plan view illustrating the construction of an embodiment according to the present invention.
Figure 2:
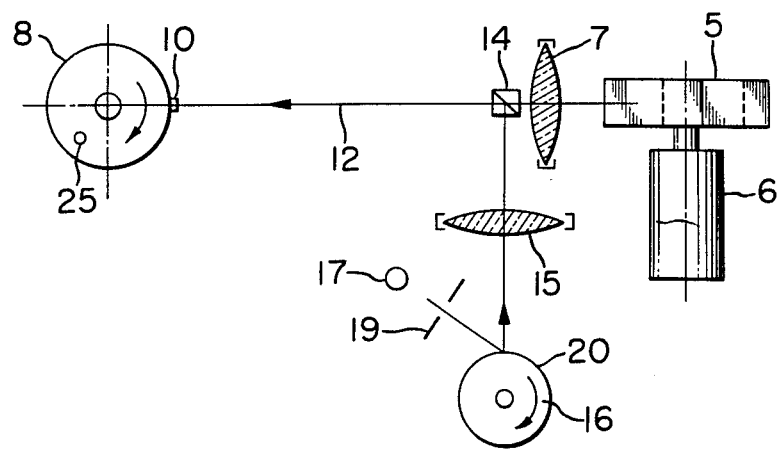
FIG. 2 is a side view thereof.

FIGS. 1 and 2 diagrammatically show a basic construction according to an embodiment of the present invention. A laser beam oscillated from a laser oscillator 1 is introduced into the input opening of a modulator 3 by reflection mirrors 2. The mirrors 2 are inserted to bend the light path to minimize the space occupied by the apparatus, and may be eliminated if they are not necessary. The modulator 3 may be either an acousto-optic modulator element utilizing the well-known acousto-optic effect, or an electro-optic element utilizing the electro-optic effect. In the modulator 3, the laser beam undergoes weak or strong modulation in accordance with an input signal to the modulator such as, for example, an output signal from an electronic computer, etc.

If the laser oscillator is a semiconductor laser, or even in the case of a gas laser, of an internal modulation type laser of a class wherein current modulation is possible, or of a class wherein a modulator element is incorporated in the oscillated light path, the modulator 3 may be omitted, and the laser beam is introduced directly into a beam expander 4.

The laser beam from the modulator 3 has its beam diameter enlarged by the beam expander 4 while it remains to be a parallel beam. The laser beam with its beam diameter having been enlarged is projected onto a rotatory polygonal mirror 5 having a plurality of mirror surfaces. The rotatory polygonal mirror 5 is mounted on a shaft provided with a high precision bearing such as, for example, a pneumatic bearing, and driven by a constant speed drive motor 6 such as, for example, an hysteresis synchronous motor or DC servomotor. The laser beam 12 which is horizontally swept by the rotatory polygonal mirror 5 is focussed as a spot on a photosensitive drum 8 by an image-forming lens 7 having an f-θ characteristic to be explained hereinafter. In ordinary image-forming lenses, there exists a relationship to be represented by the following equation with respect to the position r, at which an image is formed on the image plane when the incident angle of light is taken as θ:

$$r = f \cdot \tan \theta \quad \quad (1)$$

where: $f$ is the focal length of the image-forming lens. The laser beam 12 reflected by a predetermined rotational polygonal mirror 5 as in the present embodiment changes its incident angle onto the image-forming lens 7 as a linear function with lapse of time. Thus, the moving speed of the spot position focussed on the photosensitive drum 8 acting as the image plane is non-linearly varied and therefore not constant. In other words, the moving speed of the spot increases where the angle of incidence becomes greater. Therefore, when a train of spots are depicted on the photosensitive drum 8 with the laser beam being "ON" at a predetermined time interval, the space intervals between adjacent spots will be greater at either end of the train than at the center thereof. To avoid such a phenomenon, the image-forming lens 7 is designed to have the following characteristic:

$$r = f \cdot \theta \quad \quad (2)$$

Such image-forming lens 7 will hereinafter be referred to as "f − θ lens". When the parallel light beam is focussed in the form of a spot by the image-forming lens, the minimum diameter $d_{min}$ of the spot is given as:

$$d_{min} = f(\lambda/A) \quad \quad (3),$$

where: $f$ is a focal length of the image-forming lens; $\lambda$ the wavelength of the light used; and A the incident aperture of the image-forming lens. Thus, when $f$ and $\lambda$ are constant, the minimum diameter $d_{min}$ will be smaller as A becomes larger. The aforementioned beam expander 4 is used to assure such an effect. This means that this beam expander 4 may be omitted, if the minimum necessary spot diameter $d_{min}$ is obtained by the beam diameter of the laser oscillator. A beam detector 18 comprises a small incidence slit and a photoelectric converter element (for example a PIN diode) having a quick response time. The beam detector 18 serves to detect the position of the laser beam 12 to be swept, and, with this detected signal determines the timing for start of an input signal to the modulator 3 which is to impart a desired light information pattern onto the photosensitive drum. Thus, the error in the splitting accuracy of each reflecting surface of the rotatory polygonal mirror 5 and the irregularity in synchronization of horizontal signals resulting from irregular rotation of the mirror may be greatly reduced to ensure good quality of the resulting image as well as to permit a wider tolerance of precision required of the rotary polygonal mirror 5 and the drive motor 6, which in turn leads to lower cost of manufacture.

The laser beam 12, deflected and modulated in the above-described manner, is irradiated on the photosensitive drum 8 to form thereon an electrostatic latent image, and then developed into a visible image through an electrophotographic process, after which the visible image is transferred onto a recording paper of ordinary quality and the transferred image is fixed delivered as a hard copy as will be explained hereinafter.

Disposed between the $f - \theta$ lens 7 and the photosensitive drum 8 is a polarization beam splitter 14 which is the characteristic feature of the present invention. The beam splitter 14 is provided to synthesize an image reflected by the polygonal mirror 5 and another image obtained from a format drum 16. The construction of the format drum 16 will now be explained by reference to FIG. 2.

Figure 3:
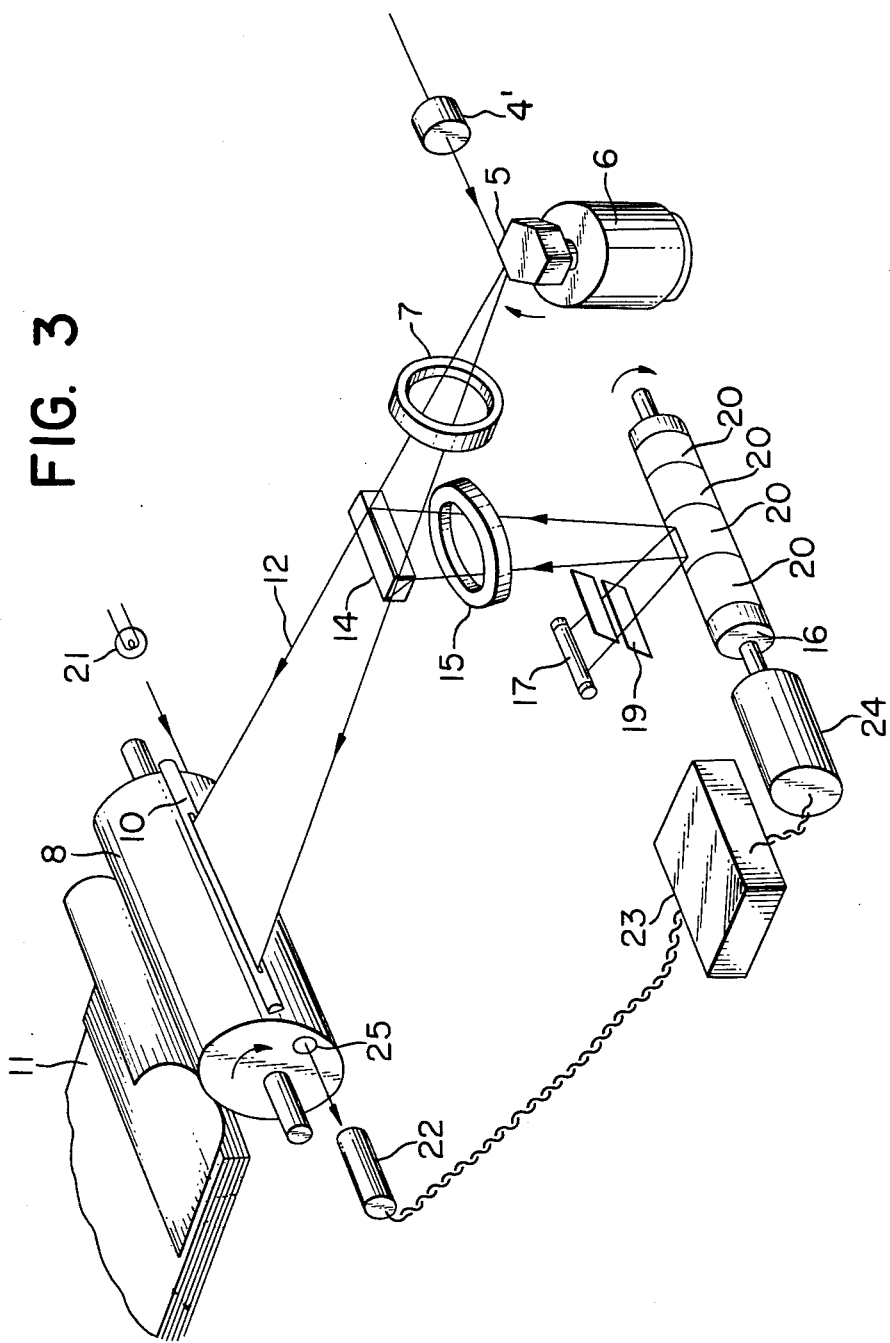
FIG. 3 is a perspective view of the embodiment shown in FIG. 1.

The format drum 16 has webs of master paper 20 wound around it, each web being arranged contiguously in the axial direction of the drum. These webs of master paper 20 have several kinds of format depicted thereon. By axially moving this format drum 16, any desired format can be selected. From the web of master paper 20 having the selected format, information from this master paper 20 can be directed as a reflected light image toward the image-forming lens 15 by the reflection method, namely, by irradiating a light beam from a light source 17 (such as a fluorescent lamp, halogen lamp, etc) on the master paper 20 through a slit 19. The light passed through the image-forming lens 15 is overlaid upon the laser light by the polarization beam splitter 14 disposed near a location where the horizontal expansion of the beam with width in the horizontal direction is as narrow as possible, whereby the light beam is image-formed on the photosensitive drum 8 either in the same size as the original image, or in an enlarged or a reduced size. The light entering into the polarization beam splitter 14 is usually unpolarized, hence, in principle, the information is forwarded to the photosensitive drum 8 with an efficiency of 50%. By rotating this format drum 16 in synchronism with rotation of the photosensitive drum 8, the information in the master format paper 20 is completely delivered to the photosensitive drum 8. Such synchronization is accomplished in the following manner, As shown in FIG. 3, the light emitted from a lamp 21 passes through a hole 25 perforated in the side walls of the photosensitive drum 8 and is detected by a detector 22 as a start signal. By a control circuit 23 using this start signal as a trigger signal, a pulse motor 24 is driven to rotate the format drum 16 in synchronism with the photosensitive drum 8.

Since the format paper is attached to the format drum 16 as described above, the format information may be freely changed as by replacement of the format paper or the format drum. Also, the format paper may be written in a negative or positive form depending on necessity. In this manner, the data and the format are irradiated on the photosensitive drum at the same time, after which the formed electrostatic image is developed into a visible image by electrophotographic process as disclosed in, for example, Japanese Patent Publication No. 23910/1967 corresponding to U.S. Pat. No. 3,666,363, and then the developed image is transferred onto a recording paper of ordinary quality and delivered as a hard copy.

By the afore-described procedures, the information from an electronic computer, etc. may be recorded, while, at the same time, a desired format may be printed.

One example of the electrophotographic process applicable to the present embodiment will be explained by reference to FIG. 5 which illustrates the process disclosed in Japanese Patent Publication No. 23910/1967. The surface of an insulating layer of the photosensitive plate 8 basically comprising an electrically conductive substrate, a photoconductive layer, and an insulating layer is uniformly charged in advance to the positive or the negative polarity by a first corona charge 9 to capture electric charges having an opposite polarity to the pre-charge in the interface between the photoconductive layer and the insulating layer, or in the interior of the photoconductive layer. Subsequently, a composite light beam consisting of a first image by the laser light 12 and a second image 29 by the format information is irradiated on the surface of the insulating layer to be charged, while, at the same time, AC corona discharge from an AC corona discharger 10 is applied to the same insulating layer surface to form on such surface a pattern resulting from the potential difference created in accordance with the light and dark patterns of the light beam. Then, the entire insulating layer surface is subjected to uniform overall exposure to form thereon an electrostatic image having high contrast. After the overall exposure, the electrostatic image is developed into a visible image by a developing device 13 with the aid of a developer chiefly composed of charged toner particles. A further corona discharger 75 is then used to remove excess developer and thereafter the visible image is transferred onto paper or other appropriate transfer medium 11 by the use of another corona discharger 76, followed by fixation of the transferred image by fixing means 46 utilizing an infrared ray lamp, a hot plate, or else to provide a printed electrophotographic image. On the other hand, after the image transfer, the insulating layer surface is cleaned by a cleaning device 48 to remove any residual charged particles therefrom to make the photosensitive drum 8 ready for reuse.

The photosensitive drum usable with the present invention is not restricted to the one disclosed in the above-mentioned Japanese Patent Publication No. 23910/1967 corresponding to U.S. Pat. No. 3,666,363, but other electrophotographic method, such as the silver salt recording method or any other recording method may equally be adopted. Further, the means for deflecting the laser beam is not restricted to the rotatory polygonal mirror 5, but a well-known acousto-optic or electro-optic deflector element or a galvanometer mirror may also be used.

The polarization beam splitter 14 will now be described. This beam splitter has the property that, of the light beam incident thereon becomes P-polarized (a polarized light whose plane of polarization is parallel to the plane of the drawing sheet of FIG. 2) which is transmitted completely therethrough, while it causes S-polarization (a polarized light whose plane of polarization is normal to the plane of the drawing sheet of FIG. 2) to be completely reflected.

Now assume that the polarization beam splitter 14 causes P-polarized light to pass therethrough, and that output light from the laser oscillator 1 is the P-polarization. In this case, the incident light can reach the photosensitive drum with the aid of the polarization beam splitter 14 without any energy loss which would be caused by a conventional beam splitter. Actually, however, light is more or less reflected because even in a laser oscillator provided with a Brewster window, the degree of polarization is not perfect and because the polarized light is offset to some extent by the modulator, the beam expander, the reflection mirror, etc. Further assume that the incident laser beam is either S-polarized or circular polarization with the polarization beam splitter 14 being in the above-described condition. In this case, a ½ or a ¼ or a ¾ wavelength plate is placed at 41 (see FIGS. 1 and 3) between the beam expander 4 and the rotatory polygonal mirror 5 to convert the laser beam into a P-polarized beam. Such waveform plate may be replaced by other means capable of changing the direction of polarization such as, for example, a combination of a ¼ wavelength plate and a polarizing plate. Also, the place of installation may be any point between the laser oscillator and the polarization beam splitter. By doing so, the polarization beam splitter 14 may effectively act against energy loss as in the aforementioned case.

In the above-described condition of the polarization beam splitter, when the incident laser beam has no polarization, the choice of the polarization beam splitter or the conventional beam splitter may be determined by the difference in the energy loss between them. This also holds true even if the polarization beam splitter is of the type which causes S-polarized light to pass therethrough.

The use of such a polarization beam splitter 14 in the optical synthesis of the information from an electronic computer and the information from the format master paper 20 is highly advantageous from the standpoint of energy loss. More specifically, it becomes possible to record the information at high speed by the use of a laser oscillator having the same output capacity, or to miniaturize the entire apparatus by use of a laser oscillator of a smaller size. It is also possible in the present embodiment to reverse the locations of the f-θ lens 7 and the polarization beam splitter 14. In that case, the image-forming lens 15 may be substituted for the f-θ lens 7, or for a combination of a suitable auxiliary lens and the f-θ lens 7. (If it is not desired that the image on the master paper be inverted on the photosensitive drum, a suitable lens, in addition to the image forming lens 15, is placed between the master paper and the photosensitive drum so as to cause the image of the master paper and the image on the photosensitive drum to be on the same direction.)

Figure 4:
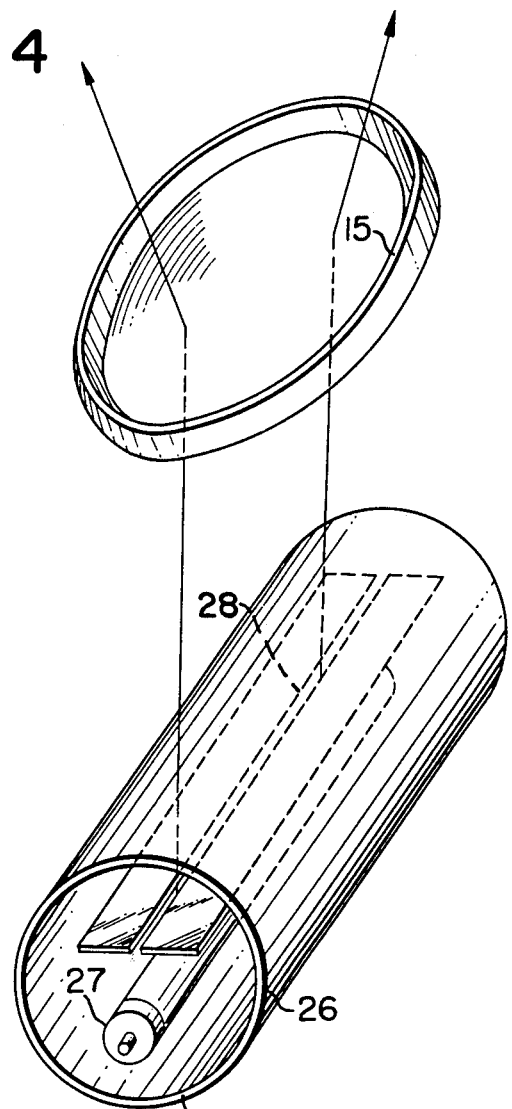
FIG. 4 is a perspective view showing a modified form of the secondary image projecting means of FIGS. 1 and 2.

Of the methods for obtaining the format information from the format drum in the form of a light signal, there is a transmission method which will be explained hereinbelow, besides the reflection method as described in the foregoing embodiment. This transmission method will now be described in reference to FIG. 4. The light emitted from a light source 27 (fluorescent lamp, halogen lamp, etc.) disposed within the format drum 16 passes through a slit 28 to illuminate a master film 26 wound around the format drum 16, from which the format information is emitted as a light signal toward the image forming lens 15. The subsequent processes, wherein such light signal is synthesized with the laser light image to form an electrostatic image on the photosensitive drum, are the same as described with respect to the previous embodiment. Interchange of the format is also similar to that in the previous embodiment, wherein the webs of the master format paper 20 are used.

The present invention is of course not restricted to the above-described embodiments, but covers various modifications without departing from the scope of the invention as defined in the appended claims.

It will be appreciated that, in the laser device of the present invention which includes means for deflecting and modulating the laser light by an extraneous signal input such as the output signal from an electronic computer, etc., and means for recording the deflected and modulated laser light on a sensitive medium such as a photosensitive drum, etc., there is provided means for focussing on the same image plane of the laser light recording means a second image such as, for example, an image providing a format, which is different from the laser light (a first image), so that the second image may be recorded along with the first image due to the laser light and thus, any desired format may be recorded freely and independently of the output device for the laser light image in overlaid relationship with the laser light image. Moreover, selection of the format can be accomplished very simply, and a composite image consisting of dual images can be advantageously obtained simultaneously on one and the same recording surface by the optical overlay technique. Consequently, the heretofore required procedure of pre-printing the secondary image such as prescribed formats, etc. on the laser light image recording paper can be omitted. In addition, such optical overlay is advantageous in that if a plurality of secondary image projecting means are installed, the laser light image as the primary image and a plurality of images such as secondary, tertiary and subsequent images may be recorded at the same time in an overlaid relationship on one and the same recording surface, whereby recording density of the information on one and the same recording paper effectively and remarkably increases.

The invention has been shown with respect to the embodiments, wherein output information from an electronic computer, etc. is converted into laser light. In these embodiments, the light to be used is not restricted to laser light, but any polarized light beam may attain the same objects, function and resulting effect of the present invention.

Still another embodiment of the present invention will now be described in detail with reference to FIG. 6 which schematically shows the basic construction of this embodiment and similar components will retain the numerical designations used in the previous embodiments.

The laser beam oscillated from a laser oscillator 1 is introduced into the input opening of a modulator 3 by reflection mirrors 2. In the modulator 3, the laser beam undergoes weak or strong modulation in accordance with the input signal to the modulator. The laser beam from the modulator 3 has its beam diameter enlarged by a beam expander 4 while it remains a parallel beam. The laser beam with its beam diameter having been expanded is projected onto a rotatory polygonal mirror 5 having a plurality of mirror surfaces. The rotatory polygonal mirror 5 is mounted on a shaft supported by a high precision bearing, and driven by a constant speed motor 6. The laser beam 12 to be horizontally swept by the rotational polygonal mirror 5 is focussed on a photosensitive drum 8 as a spot through an image-forming lens 7 having the above-described $f$-$\theta$ characteristic.

The laser beam so deflected and modulated is irradiated on the photosensitive drum 8, and the formed image is developed into a visible image through an electrophotographic process, after which the developed image is transferred and fixed onto recording paper of an ordinary quality and delivered as hard copy.

Figure 6:
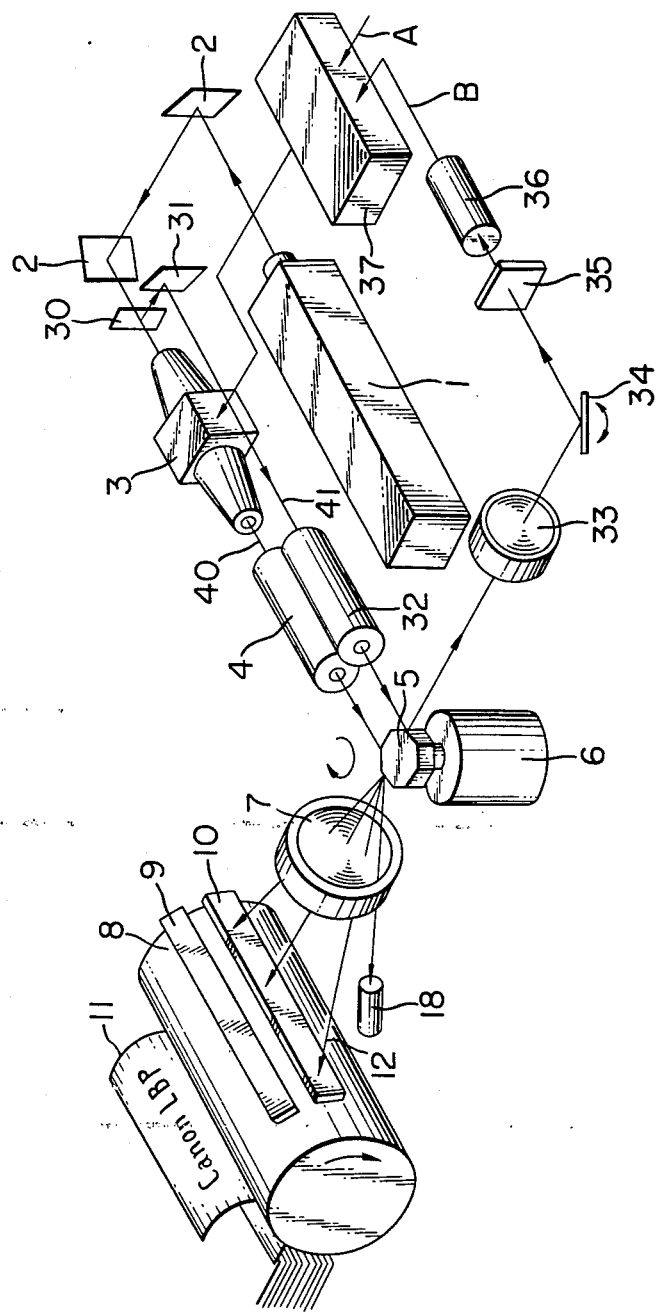
FIG. 6 is a perspective view showing the construction of the image information recording apparatus according to another embodiment of the present invention.

In FIG. 6, a half-mirror 30 reflects a part of the laser light before it enters into the modulator 3 to form a second light path (the laser light travelling along the second light path will hereinafter be referred to as the "second laser light beam" and be distinguished from "the first laser light beam" which passes through the modulator 3.

The reason for forming the second laser light beam 41 is to enable a plurality of information pattern from different information sources to be recorded on one and the same recording medium. In the shown embodiment, the second laser light 41 is used to produce a second information signal, i.e., a read-out light for the image information such as format, and so on. By applying the laser light to this image information, photoelectric conversion is effected to produce an electrical signal corresponding to the image information. As the sensitivity of the photoelectric converter of this type is generally higher than that of the photosensitive medium for the order of $10^3$ to $10^6$ times, the ratio of dividing the initial laser light into the first laser light beam 40 and the second laser light beam 41 by the half-mirror 30 may be $1:10^3$–$10^6$ for the second laser light, when the initial laser light before it is split is taken as 1. This means that the second laser light may be very small in intensity for the splitting, hence the half-mirror 30 may be substituted with a transparent glass plate, as the case may be.

The second laser beam is given its particular light path so as to be projected onto one of the reflecting surfaces of the rotatory polygonal mirror 5 through a beam expander 32, similar to the beam expander 4. The light beam reflected by the reflecting surface is then converged by a lens 33 to be focussed on a predetermined format 35 which is a second information carrier. A galvanometer mirror 34 disposed between the lens 33 and the format 35 is of a known type, and acts to deflect the second laser beam to the format 35.

As the first laser light beam 40 has been modulated by an information signal (to be described hereinafter) applied to the modulator 3, and has been projected on the rotatory polygonal mirror 5 through the beam expander 4, as has already been described, the first and the second laser light beam, even if they are not projected on one and the same incident surface, are perfectly deflected in synchronism with each other, because both laser lights are reflected by the same rotational polygonal mirror. On account of this, the deflecting speed and synchronization are perfectly coincided between the first laser light beam which is the recording light and the second laser light beam which is the reading light. Accordingly, in FIG. 6, the recording position on the photosensitive medium 8 in the horizontal direction and the recording position on the predetermined format 35 coincide with each other. Since the photosensitive medium 8 is constructed in the form of a drum and rotates, the vertical movement of the light beam on the format 35 must occur in synchronism with the rotation of the drum. In the present embodiment, this is realized by the use of the galvanometer mirror 34. That is, the mirror 34 is driven by a saw-tooth wave current corresponding to the rotation of the drum 8. Alternatively, it may be possible that the format 35 is vertically moved by a method for moving the light beam in the vertical direction in synchronism with the rotation of the drum. In the illustrated embodiment, the format 35 is constructed with a format film for transmitting light therethrough, although any other information carrier may be used when reflected light is utilized.

The light transmitted through the format film is converted into an electrical signal by a photoelectric converter 36 such as a photoelectric multiplier tube, etc. Such electric signal is applied to one of the input terminals of an electrical signal synthesizing amplifier 37 as a signal B corresponding to the format surface which is the second information source. A first information signal A which is the output information from an electric computer, etc. is applied to the other input terminal of the amplifier 37 in which the signal is synthesized. After the synthesis, the signal is fed from the amplifier and applied to the modulator 3 as an input signal. By this input signal, the first laser light is modulated and projected, for recording, onto the photosensitive drum 8 as light information the first and the second information sources being overlaid, as previously decribed.

Figure 7A:
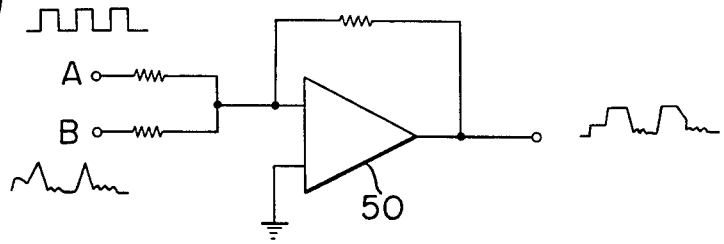
FIGS. 7(A) to (D) are respectively circuit diagrams showing various forms and the modulated signal synthesizing means applicable to the apparatus of the present invention.

The manner of the synthesis within the synthesizing amplifier 37 is variable, and typical examples thereof will be explained in reference to FIGS. 7(A) – 7(D). FIG. 7(A) shows an example in which the addition operation is carried out with an output signal A from the electronic computer, etc. and an operational amplifier 50 with a signal B obtained from the format remained to be an analog signal. According to this example, tone of the format is recorded simultaneously with the signal A in high fidelity.

Figure 7B:
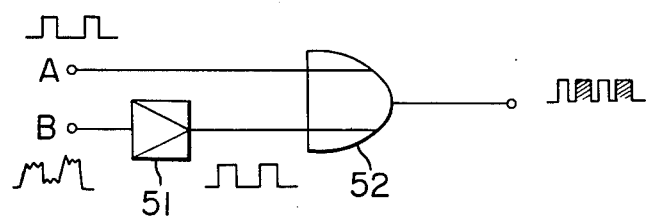

FIG. 7(B) shows an example, in which the density of the signal B, in particular, on the recording surface, is made constant by converting the analog signal B into a binary signal consisting of 0 and 1 through a comparator 51, and by causing an output resulted from the logical sum of the binary signal information from a computer, etc. and an OR gate 52 to be applied to the modulator.

Figure 7C:
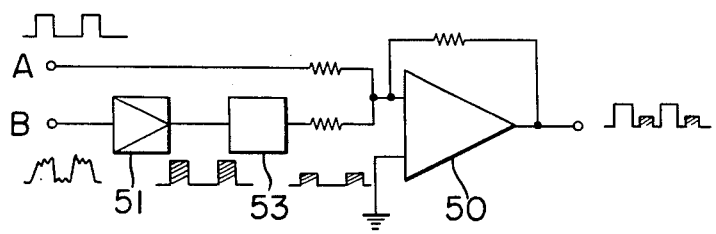

FIG. 7(C) shows an example, in which the analog signal B is converted into a binary signal by the comparator 51 as previously described, thereafter its gain is dropped by an attenuator 53 to a level lower than the image signal A from a computer, etc., and then the low-levelled analong signal is applied to the operation amplifier 50. By so doing, the density of the format on the recording surface becomes low.

Figure 7D:
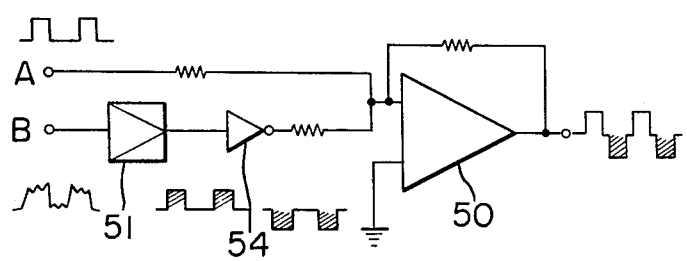

In a further example shown in FIG. 7(D), the signal B is converted into a binary signal by a comparator 51, is inverted by an inverter 54, after which the inverted signal is applied to an operational amplifier 50 together with the signal A so that the tone of the format on the recording surface may be inverted. By so doing there can be provided a negative or a positive image which is an inverted format image.

Figure 8:
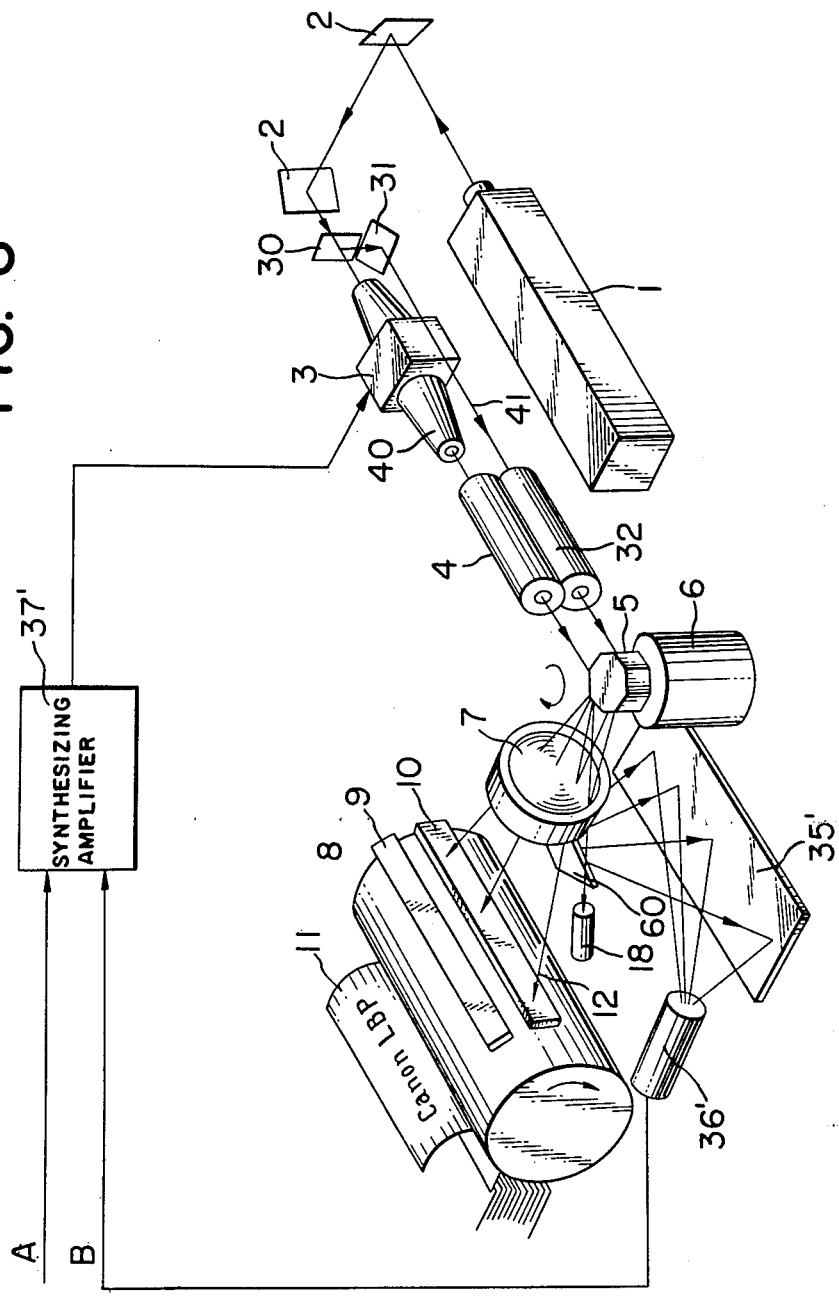
FIG. 8 is a perspective view showing the construction of the apparatus according to still another embodiment of the present invention.

FIGS. 8 and 9 illustrate other embodiments of the present invention.

In the above-described embodiments, when the first and the second laser light beams are projected onto different reflecting surfaces of the rotational polygonal mirror 5, errors in finished precision on each reflecting surface of the rotatory polygonal mirror would result in vertical irregularity of the image corresponding to the format image on the photosensitive drum. In other words, during the recording, the period of time, at which the spot of laser light comes to a particular horizontal position on the drum, slightly deviates due to errors in precision of the mirror surfaces of the rotary polygonal mirror, irregular rotation of the driving motor, and other factors. If a beam position detector 18 is used to correct this deviation, the relative horizontal position of the laser light on the recording drum and on the format will become deviated for each scanning line. To overcome this problem, it is preferable that the first and the second laser light beams are projected on one and the same mirror surface of the rotary polygonal mirror 5.

In view of the abovementioned point, it is further preferable to use a common image-forming optical system, by which it will also become possible to eliminate any distortion of positional deviation which would otherwise result from the use of different image-forming systems. Also, if the magnification of the image forming system concerned with the format information is reduced, microfilm or the like may become usable as the format, which facilitates interchange and retrieval of the format. Such arrangement is advantageous when a number of formats are to be automatically interchanged.

The specific construction of the above-described embodiment is shown in FIGS. 8 and 9. In explaining the embodiment, those elements which are common to the above-described embodiment are designated by the same reference numerals, and the description thereof is omitted or otherwise made brief.

The second laser light beam 41 is produced by using a half-mirror 30 to split the beam. The beam 41 is then reflected by a mirror 31 to pass through a beam expander 32, and is projected onto a mirror surface 5a on which the first laser light is also projected (see FIG. 9).

The laser light beams reflected by the mirror surface 5a pass through a common image-forming lens ($f$-$\theta$ lens), after which the first laser light beam 40 is projected upon the recording surface of the photosensitive drum 8, while the second laser light beam 41 is reflected by a mirror 60 so as to be projected and focussed upon a second information carrier 35' such as a format, and so on. The amount of the reflected light varies in accordance with the information formed on the carrier 35'. Such reflected light passes through a suitable optical system (not shown) to a photoelectric converter 36' where it is converted into an electrical signal. The electrical signal resulting from the conversion is applied to a synthesizing amplifier 37' as the second information signal B, and synthesized with the first information signal A which is the recording information and, as is the case with the abovementioned embodiment, thereafter the synthesized output signal is applied to the modulator 3 to modulate the first laser light beam. The first laser light beam so modulated is projected onto the photosensitive drum 8 via the rotatory mirror 5 and through the image forming lens 7 to effect recording of the information thereon, as already noted. In this embodiment, the second information carrier 35' is moved by a conventional driving means in synchronism with rotation of the photosensitive drum 8 and in the direction perpendicular to the scanning direction of the mirror 5.

FIG. 10 illustrates a modification of the foregoing embodiment. In this modified embodiment the first laser light beam 40 and the second laser light beam 41 are projected onto a mirror surface at a common point thereon and are reflected therefrom so as to reduce the requisite thickness of the rotational mirror shown in FIG. 9. For this reason, this figure is depicted in an exaggerated manner, although, in reality, the light paths are so set that the two laser light beams may be incident upon the thin rotational polygonal mirror 5' at slightly different angles of incidence. Since the angles of reflection of the mirror surface are also variable with the angles of incidence, the light beams can be separated, so that the second laser light beam is made to be reflected toward the second information carrier 35' by the mirror 60. The other component elements in this modification are similar to those in the foregoing embodiment. This modification is advantageous in that the thickness of the rotational polygonal mirror can be very small as already mentioned.

FIG. 11 shows, in block diagram, another modification of the previous embodiment, wherein those component elements which are similar to those in the previous embodiment are given similar reference numerals. Assuming that the first laser light beam for recording the output information from an electronic computer is P-polarized (polarized light whose plane of polarization is parallel to the plane of the drawing sheet of FIG. 11), this laser light is split into a first and a second light beams by a half-mirror 30, and the second laser light beam is directed by a mirror 31 to a phase plate 80 disposed in the second light path and converted into the S-polarized light (polarized light whose plane of polarization is normal to the plane of the drawing sheet of FIG. 11), and the S-polarization in turn is reflected by a mirror 66, to be directed to a polarization half-mirror 67 disposed in the first light path where it is synthesized with the first laser light beam. This polarization half-mirror 67 has a property of permitting passage therethrough of the first laser light (P-polarization), and reflecting the second laser light (S-polarization). The synthesized light passes through a beam expander 4 to project onto a rotatory polygonal mirror 5' from which it pass through an $f$-$\theta$ lens 7 to another reflection mirror 68 where the second laser light is again separated from the first laser light, and projected toward a second information carrier 35'. The light transmitted through or reflected by this information carrier is photoelectrically converted to provide a second information signal B, which is then synthesized with the output information signal A from an electronic computer, etc., and the synthesized signal is used to modulate the laser light in the modulator 3, as already described in connection with the foregoing embodiments. Recording of the laser light after the modulation may be effected in exactly the same manner as in the above-described embodiments.

In the above embodiment, the present invention has been described with reference to recording information from two independent information sources on a common recording medium, but it will be apparent that information from more than two sources can be synthesized and recorded according to the present invention in exactly the same manner as described in the foregoing.

According to the present invention, as has so far been described, a plurality of light beams are made to correspond in number to the information sources, and, when one of the light beams is modulated by a signal from the corresponding information source, the other information is read out by other light beam, and the signal read out is added to the modulating signal to form a synthesized modulating signal, with which at least one light beam is ultimately modulated, thereafter the light beam is projected upon a photosensitive medium to effect the recording. Thus, the present invention can eliminate the heretofore required procedures of recording a plurality of information patterns on a common recording medium through separate processes, and moreover, enables different types of information from various information sources to be recorded at one time as light information on the recording medium by the same process, irrespective of the type of informations to be recorded. As a result, the working efficiency and the recording density advantageously improve.

Still another embodiment of the present invention will now be described in detail in reference to FIG. 12 which shows a perspective view of such embodiment and wherein those component elements which are similar to those of the previous embodiments are given similar reference numerals.

In FIG. 12, the laser beam oscillated from a laser oscillator 1 is directed by mirrors 2 to the input opening of a modulator 3. The laser beam from the modulator has its beam diameter enlarged by a beam expander 4, while remaining a parallel light beam. The laser beam with increased beam diameter is projected onto a rotatory polygonal mirror 5 having one or more mirror surfaces. The rotatory polygonal mirror 5 is mounted on a shaft supported by high precision bearings, and driven by a constant speed motor 6. The laser beam 12 horizontally swept by the rotatory polygonal mirror 5 passes through an image-forming lens 7 having the above described $f$-$\theta$ characteristic, and is focussed as a spot on a photosensitive drum 8.

Exposure to a second light image such as a finite format, etc. will now be described in reference to FIG. 5. An original image information 35 such as a predetermined format, etc. attached to a format drum 16 is illuminated by an exposure lamp 17 (fluorescent lamp, halogen lamp, etc.). The light-reflected by the original then passes through a slit means 19 and is reflected by a mirror 60 to further travel through an image-forming lens 33 so as to be enlarged, reduced or kept in the same size as the original and focussed as a format light beam 29 on the photosensitive drum 8. Incidentally, this reflection mirror 60 is for reducing the space occupied by the apparatus, and may of course be eliminated if it is not required. The original image information surface or format 35, etc. need not always be of the reflection type, but may be of the transmission type such as film, etc., which bears thereon a positive image.

In the above-described manner, the data of the first light image and the format of the second light image are synthesized on the photosensitive drum 8.

Figure 13:
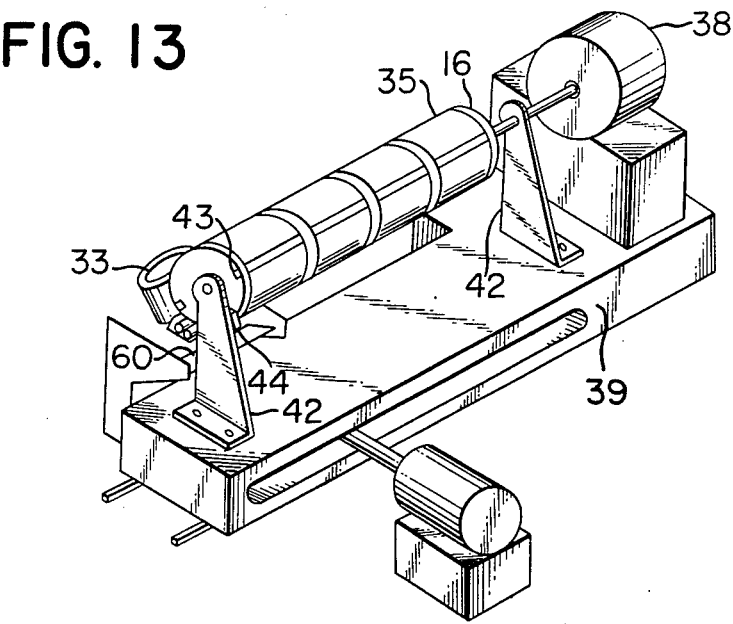
FIG. 13 shows a perspective view of the driving mechanism for the second light image in the FIG. 12 embodiment.

The driving mechanism for the finite format in the present embodiment will now be explained in detail in reference to FIG. 13. In FIG. 13, various kinds of predetermined format originals 35 are mounted side by side on the format drum 16 and rotated at a predetermined velocity by a format driver 38. The formats are also moved with a format drum supporting bed 42 in the axial direction of the format drum 16 by a format selector 39 so that a particular format original 35 may be selected from among the various kinds of formats. Interchange of the predetermined format originals 35 may be freely carried out by replacement of the format paper or by replacement of the drum itself.

The format light 29 from the predetermined format original 35 is projected upon a position synchronous with the position upon which the laser beam 12 is projected. More specifically, when the format base drum 16 rotating at a predetermined velocity arrives at a predetermined rotational position, it produces a "ready" signal. After an adjustment time, data are entered and the projection of the laser beam starts. The time adjustment is such that, when the photosensitive drum is rotated to bring a portion thereof which has been exposed by the starting laser beam to an exposure position for exposure by the finite format light, the top of the page of the finite format original reaches that position.

The time difference $T_2$ between start of the data input and start of the exposure on the top page the finite format original is represented by the following equation:

$$T_2 = (l_l - f/vpd)$$

where $l_l - f$ is the distance between the laser beam exposure position and the finite format light exposure position; and $vpd$ is the peripheral speed of the photosensitive drum. Also, the time $T_1$ after the generation of the "ready" signal till exposure start for the page top of the finite format original is represented by the following equation:

$$T_1 = (l_r - f/vf)$$

where $l_r - f$ is the distance between the fitting position of the "ready" signal generating switch and the page top position of the finite format original; and $vf$ is the peripheral speed of the finite format original. In the present embodiment, as shown in FIG. 13, the "ready" signal is generated by detecting a "ready" point 43 attached to one end of the format base drum 16 by a microswitch 44.

Figure 14:
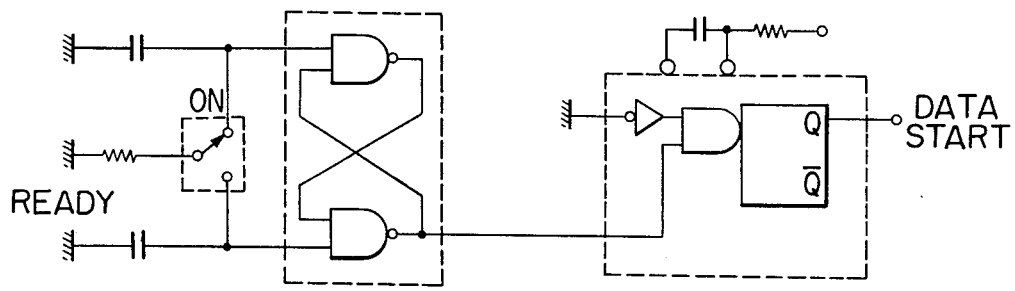
FIG. 14 is a circuit diagram of the means for synchronizing the first and the second light image in the FIG. 12 embodiment.

After reception of the "ready" signal, the start time is represented by a data start signal generated by a circuit shown in FIG. 14, i.e., by triggering a monostable multivibrator with the "ready" signal, and may easily be adjusted by the inversion time of the monostable multivibrator through variation of its time constant.

Figure 15:
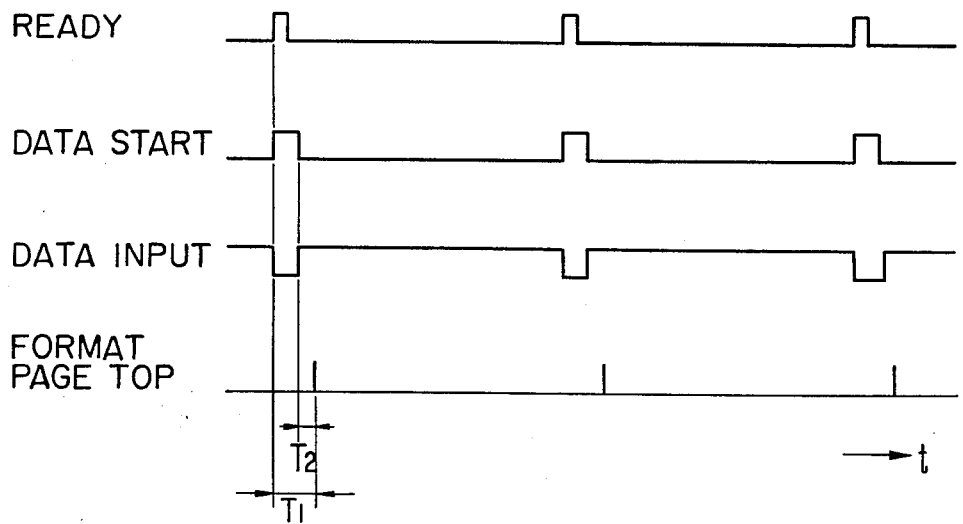
FIG. 15 is a time chart for the synchronizing means shown in FIG. 14.

This is shown in the time chart of FIG. 15. In this time chart the time period from the reception of the "ready" signal till the data start, i.e., $T_1 - T_2$, is the inversion time of the monostable multivibrator and by adjustment of this time, the data input time is adjusted to synchronize the page top of the finite format. In the present embodiment, the finite format has been described as being of the drum type. Alternatively, the finite format may of course be of the flat type.

Description will now be made of the printing portion 45 in FIG. 5. The electrophotographic process applicable to the present invention comprises various steps, as follows. That is, the surface of the insulating layer of the electrophotosensitive medium 8, which medium consists essentially of an electrically conductive substrate, a photoconductive layer, and an electrically insulative layer is uniformly charged in advance to either positive or negative polarity by a primary corona charger 9 to capture electric charges of opposite polarity to the primary charge existing in the interface between the photoconductive layer and the insulative layer, or in the interior of the photoconductive layer. Subsequently, the laser beam 12 is irradiated onto the surface of the charged insulative layer. Simultaneously with, prior to, or after, the laser beam irradiation the insulative layer surface is subjected to the AC corona discharge, or the secondary discharge in opposite polarity to that of the primary charge by the use of a secondary corona discharger 10. Thereafter, the insulating layer surface is exposed to the positive image of the finite format light 29, by the light stimulus of which a surface potential difference is created between the exposed portion of the photosensitive medium by the laser beam as well as the dark portion corresponding to the finite format and the remaining portion of the photosensitive medium to thereby form a synthesized electrostatic image. The thus obtained electrostatic image is then developed into a visible image by developing means 13 using a developer composed chiefly of charged toner particles. Thereafter excess toner is removed by a corona discharger 75; after which the visible image is transferred onto paper or the like transfer medium 11 by the utilization of an internal or external field such as corona discharger 76. Then, the transferred image is fixed by fixing means 46 such as infrared ray lamp or hot plate to provide an electrophotographically printed image 47. On the other hand, the insulating layer surface after completion of the image transfer is cleaned by cleaning means 48 to remove any residual charged particles to make the photosensitive medium 8 ready for reuse.

Formation and development of the synthesized latent image referred to above will hereinafter be described in greater detail.

Figure 5:
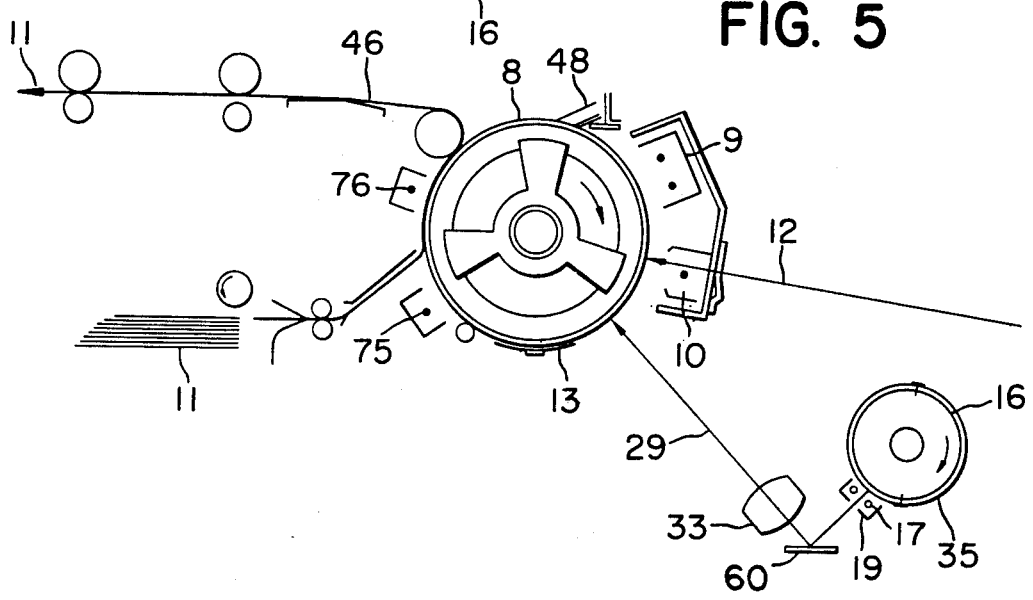
FIG. 5 illustrates one example of the electrophotographic process for use with the apparatus of the present invention.

Referring to FIGS. 5 and 16, the surface of the insulating layer 56 of the photosensitive medium 55 is subjected to the uniform primary charge 57 by a corona charger 9 (FIGS. 5 and 16a) This charge should preferably be positive if the photoconductive layer 58 is formed of an N-type semiconductor, and negative if the layer 58 is formed of a P-type semiconductor. In the shown example, the insulating layer surface is charged to the positive polarity, and in correspondence to this positive charge 57, charges 59 of opposite polarity, namely, the negative polarity, are captured in the portion near the insulating layer 56 of the photoconductive layer 58.

Subsequently, the insulating layer surface is subjected to the AC corona discharge 10 (FIGS. 5 and 16b), while, at the same time, it is being subjected to a first exposure A by the laser beam, the photoconductive layer 58 of the bright area $A_L$ of the photosensitive medium 55 is rendered electrically conductive by the light stimulus to be turned into a state, wherein the captured charges 59 are proved to be discharged toward the electrically conductive substrate 61. Consequently, all or a major part of the charges 57 on the insulating layer surface can be easily removed along with the corresponding captured charges 59, in conjunction with the discharging action of the AC corona. In the dark area $A_D$, on the other hand, the resistance value of the photoconductive layer 58 is so high that there is no discharge of the captured charges 59 toward the photoconductive substrate 61, under the influence of which the rate of discharging of the charges 57 on the insulating layer surface by the AC corona is lower than in the bright area $A_L$. Nevertheless, there is little difference in surface potential (electrostatic contrast) between the two areas $A_L$ and $A_D$. Next, when a second exposure B by the finite format is effected (FIG. 16(c)), the charged state in the dark area $B_D$ is maintained as it is, since there is no light stimulus in this area, hence no variation in the surface potential. Also, in the bright portion $A_L$ of the bright area $B_L$, which has been subjected to the first exposure, little variation takes place in the state of the photoconductive layer 58 any longer, even if it is again exposed to light, and, accordingly, the surface potential of the insulative layer does not vary, so that it is maintained at a level substantially equal to that of the dark area $B_D$. In the bright area $B_L$ other than the portions $B_D$ and $A_L$, the photoconductive layer 58 is, for the first time, rendered conductive by the light stimulus, in consequence of which the captured charges 59 are all discharged into the electrically conductive substrate 61, leaving therein only a quantity of the charges equivalent to the charges 57 on the insulative layer surface and finally disappear. As the result, there occurs an abrupt increase in the external field within the charges 57 on the insulative layer surface, the surface potential rises. Thus, there is created a great difference in the surface potential between the bright area $A_L$ in the first exposure and the bright area $B_L$ in the second exposure, whereby a latent image with high contrast is formed. The surface potential distribution on the photosensitive medium 55 at this moment is shown in FIG. 16(d). As seen, the surface potential is high ($V_{D-L}$) only in the portions which were dark in the first exposure and became bright in the second exposure, and it is substantially zero in the remaining portions.

Therefore, if such photosensitive medium 55 is developed with a toner, the synthesized image which has resulted from the first and the second exposure may be made into a visible image.

Figure 16A:
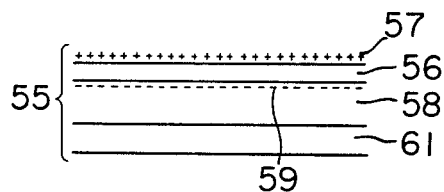
FIGs. 16(a) through 16(i) inclusive illustrate the electrophotographic process.
Figure 16B:
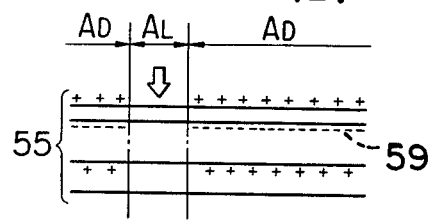
Figure 16F:
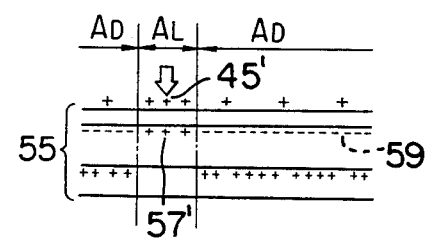
Figure 16C:
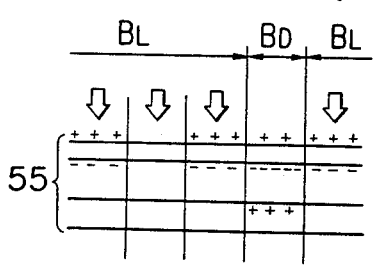
Figure 16G:
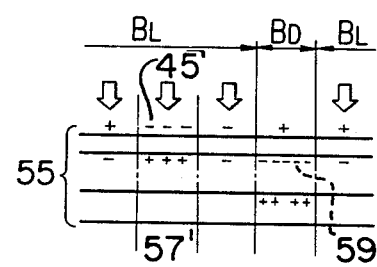
Figure 16D:
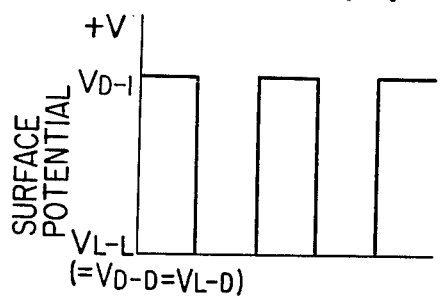
Figure 16H:
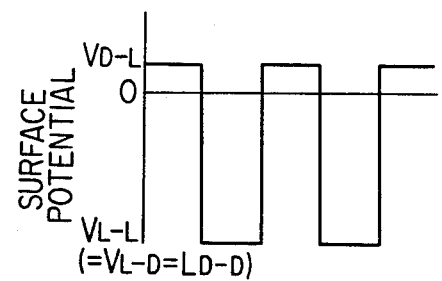
Figure 16E:
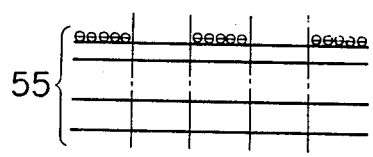

FIG. 16(e) shows a case where the image development is carried out by the use of a toner having an opposite polarity to that of the primary charge, i.e., negative polarity. In this case, the toner particles adhere to the area which was dark in the first exposure, but was bright in the second exposure. Inversion development, namely, the development using the toner of the same polarity as that of the primary charge, can also be effected, in which case the development is reverse to the positive development. As is well-known, a much better result is obtained, if a developing electrode is employed.

In the above-described process steps, the AC corona discharge to be conducted simultaneously with the first exposure may be replaced by the combined application of the first exposure and the secondary charge of opposite polarity to that of the primary charge, and similar image synthesis can still be made.

When the secondary charge in opposite polarity to that of the primary charge, i.e., the negative polarity is conducted to the photosensitive medium 55 shown in FIG. 16(a), while it is being subjected to the first exposure (see FIG. 16(f)) by the laser light, the photoconductive layer 58 in the bright area $A_L$ is rendered electrically conductive by the light stimulus, and the captured charges 59 are brought to a state, in which they tend to be discharged into the conductive substrate 61. In this way, the primary charges 57 applied onto the surface of the insulating layer are all discharged together with the corresponding captured charges 59 by the neutralizing action of the applied secondary charges in opposite polarity to that of the primary charges. Subsequently, the charge polarity on the insulating layer surface is inverted by the applied secondary charges, and recharged to the negative polarity as indicated by 45', in correspondence to which captured charges 57' of the positive polarity are produced.

On the other hand, in the dark area $A_D$, the resistance value of the photoconductive layer 58 is so high that there is no discharge of the captured charges 59, under the influence of which, all or major portion of a the applied primary charges 57 on the insulating layer are discharged only, but seldom is the dark area $A_D$ recharged to the negative polarity as in the bright area $A_L$. In this manner, the charge distribution on the insulating layer surface in the bright and dark areas $A_L$ and $A_D$ is such that while the bright area $A_L$ is of the negative polarity, the dark area $A_D$ has no charge or has positive charges, although there is little difference in the surface potential between the areas $A_L$ and $A_D$. In other words, since a large quantity of the captured charges 59 which are of the same polarity as that of the charges applied on the surface of the insulating layer in the bright area $A_L$ remain captured in the dark area $A_D$, and cause a strong external field, the surface potential is substantially equal between the bright area and the dark area, even if positive charges remain more or less on the surface of the insulating layer in the dark area $A_D$.

Figure 16I:
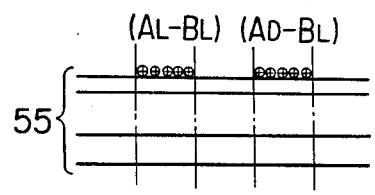

When the second exposure B for the finite format image is subsequently conducted (FIG. 16(g)), the charged state in the dark area $B_D$ remains unchanged without any variation in the surface potential, because there is no light stimulus imparted to this area. Also, in the portion of the bright area $B_L$ which overlaps the bright area $A_L$ in the first exposure, the charges 57' in the photoconductive layer 58 no longer attenuate so much, even if the portion is again exposed to light, whereby a surface potential substantially equal to that of the dark area $B_D$ is maintained. On the other hand, as the remainder of the bright area $B_L$, exclusive of the areas $B_D$ and $A_l$ becomes electrically conductive for the first time by the light stimulus, of the captured charges 59 are all discharged into the electrically conductive substrate and disappears, leaving a quantity of electric charges equivalent to the applied positive charges 57 remaining on the insulating layer surface. As a result, the negative external field provided by the captured charges 59 abruptly attenuates and the surface potential of the insulating layer increases. In case of the applied positive charges still remains on the insulating layer surface, the surface potential is inverted to a positive level, whereby there is created a large difference in the surface potential between the areas $B_D$ and $A_L$ which maintain the negative surface potential, resulting in formation of a latent image with high contrast. The surface potential of the photosensitive medium at this time is as shown in FIG. 16(h), from which it is recognized that the potential difference occurs between the portion which was dark in the first exposure, but bright in the second exposure, and the remaining portion. when such latent image is developed by the use of toner having the same polarity as that of the primary charge, the toner particles adhere to said remaining portion as shown in FIG. 16(i). When a toner having the opposite polarity to that of the primary charge is used, development will occur in the reverse manner.

Figures 17A, 17B:
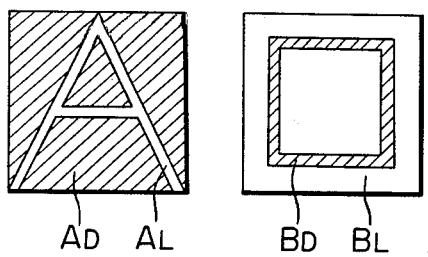
FIGS. 17(a) through 17(d) illustrate samples of images formed by the apparatus of the present invention.
Figures 17C, 17D:
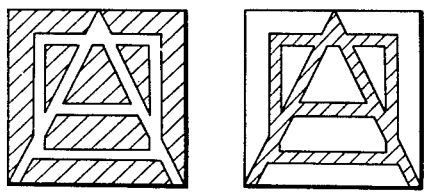
Figures 20C, 20D:
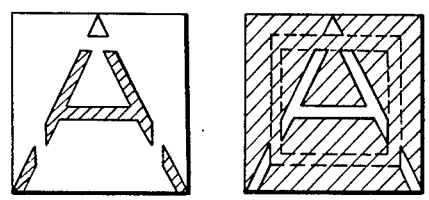
Figures 21A, 21B:
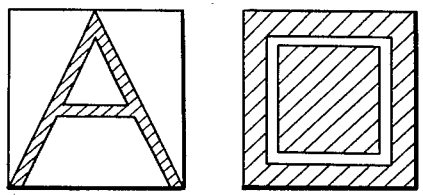

From the above-described electrophotographic process, it will be understood that, when the first exposure image by the laser beam as shown in FIG. 17(c) and the second exposure image by the finite format as shown in FIG. 17(b) are synthesized, and the synthesized image is developed by the use of a toner having the opposite polarity to that of the primary charge, it will represent a form as shown in FIG. 17(c), and that, when the same synthesized image is developed by the use of a toner of the same polarity as that of the primary charge, it will represent a form as shown in FIG. 17(d).

Specific examples of the synthesized image formation employed in the foregoing embodiment will be shown herein below.

A photosensitive plate comprising a photoconductive layer formed by coating on an aluminum substrate of about 100-micron thickness a photosensitive substance prepared by adding 10 grams of vinyl chloride to 90 grams of copper-activated cadmium sulfide, and further adding and mixing a small amount of thinner to a thickness of 40 microns, and an insulating layer of polyethylene terephthalate having a thickness of 25 microns, was subjected to uniform primary charge at +1800V by a corona discharger, and then subjected to AC corona discharge simultaneously with exposure by an He-Ne laser at an exposure rate of 1 $\mu j/cm^2$, followed by exposure to the positive image of a finite format at an exposure rate of 1 luxes/sec.. When this photosensitive plate was immediately immersed for development in a positively charged toner, there appeared a very clear synthesized positive image consisting of the laser image and the finite format image.

As another example, a photosensitive medium was prepared by vacuum-evaporating on an aluminum substrate a Te layer to a thickness of about 1-micron, and further vacuum-evaporating on this Te layer an Se layer with 15% Te content to a thickness of about 50 microns to thereby form a photoconductive layer, and by subsequently applying to the surface of the photoconductive layer a transparent insulative resin to a thickness of about 30-micron, and setting the resin.

The surface of the insulative layer on this photosensitive medium was subjected to uniform primary charge at −1000V, and then subjected to secondary charge at +1000V simultaneously with exposure to an He—Cd laser at an exposure rate of $2\mu j/cm^2$, followed by exposure to the positive image at an exposure rate of 15 luxes/sec.. When this photosensitive plate was developed by a magnetic brush using a negatively charged toner, a very clear, positive, synthesized image consisting of the negative laser image and the positive format image was obtained. The use of a positively charged toner resulted in a very clear, negative, synthesized image.

Figure 18:
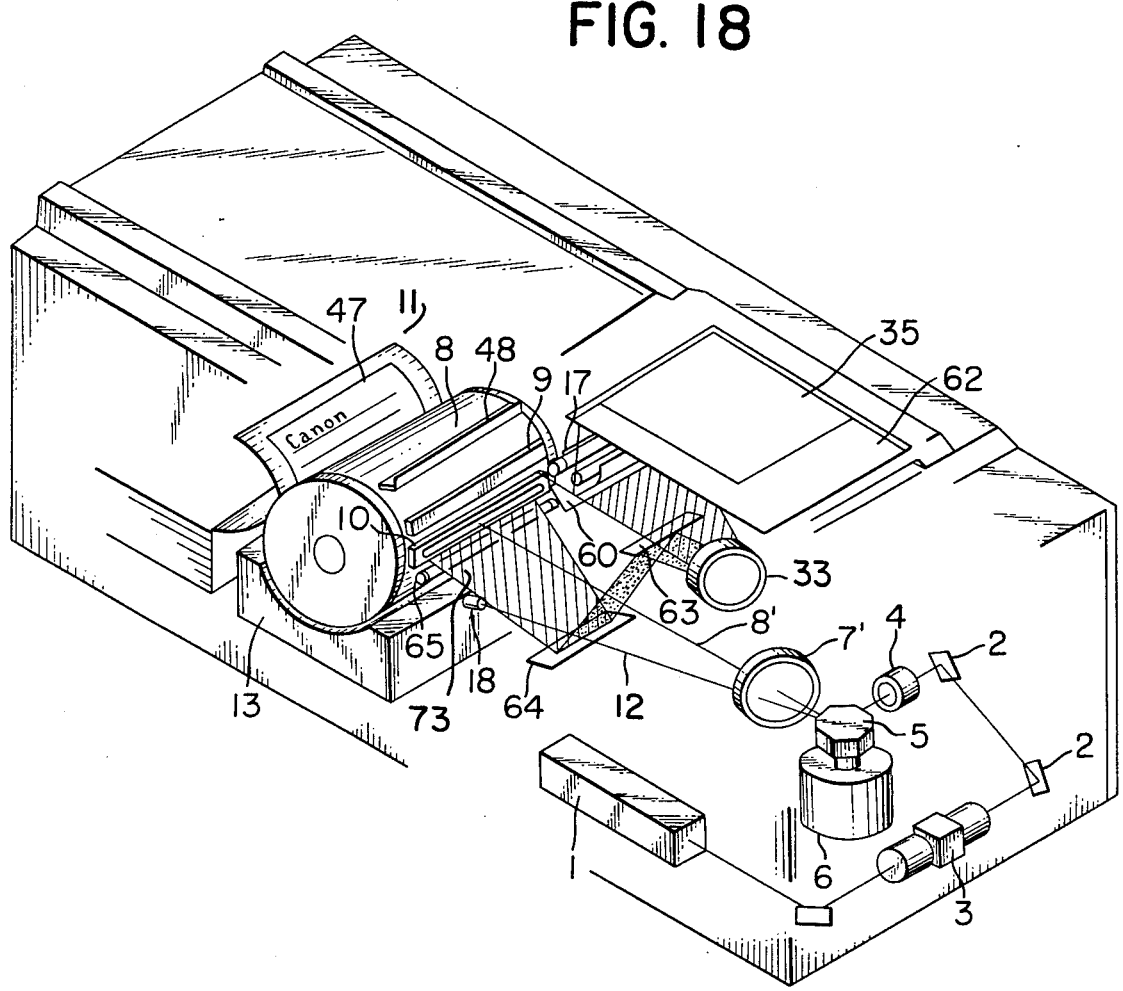
FIG. 18 is a perspective view showing still further embodiment of the present invention.
Figure 19:
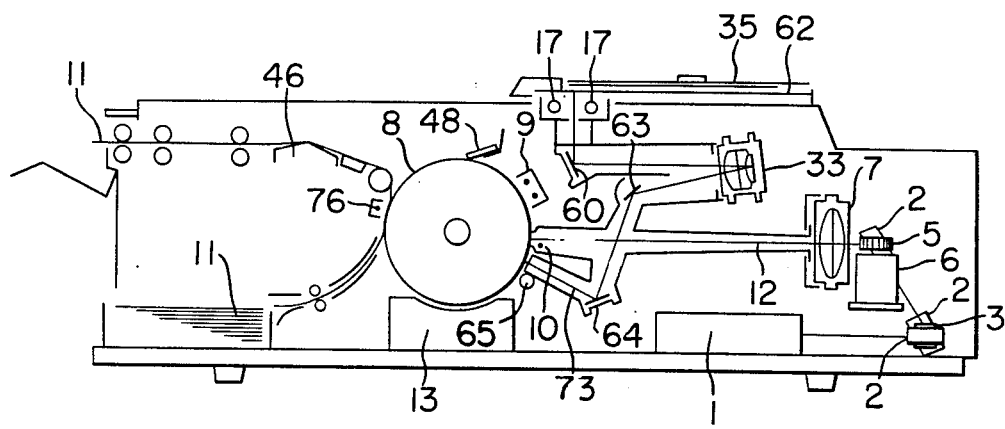
FIG. 19 is a cross-sectional side elevation of the FIG. 18 embodiment.

In the following, a further embodiment of the apparatus according to the present invention will be described in detail by reference to FIG. 18 showing a perspective view of this embodiment, and FIG. 19 showing side elevational view thereof, and wherein those components which are similar to those of previous embodiments are given similar reference numerals.

In FIGS. 18 and 19, the laser beam oscillated by a laser oscillator 1 is directed by a mirror 2 to the input opening of a modulator 3. In the modulator 3, the laser beam is subjected to weak or strong modulation in accordance with the input signal to the modulator, and then to deflection. The laser beam from the modulator 3 has its beam diameter enlarged by a beam expander 4, while it remains a parallel beam. The laser beam with its beam diameter so increased is projected upon a rotational polygonal mirror 5 having a plurality of mirror surfaces. The rotational polygonal mirror 5 is mounted on a shaft supported by high precision bearings, and driven by a constant speed motor 6. The laser beam is horizontally scanned by the rotational polygonal mirror 5. Alternatively, the scanning may be effected by a galvanometer mirror (not shown). The laser beam horizontally scanned by the rotational polygonal mirror 5 passes through an image-forming lens 7 having the above described $f$-$\theta$ characteristic, and is focussed onto photosensitive drum 8 as a spot. A beam detector 18 comprises a small incidence slit and a photoelectric converter element (for example, a PIN diode) having a quick response time. The beam detector 18 detects the position of the laser beam to be swept, with which detection signal determines the timing for the start of the horizontal scanning input signal to the modulator for imparting a desired light information pattern onto the photosensitive drum. The reason for using the $f$-$\theta$ lens 7 and the beam detector 18 has already been set forth in the foregoing.

The laser beam 12 modulated by an extraneous signal in the above-described manner is projected upon a photosensitive drum 8 from a first exposure position which will be described later. On the other hand, an original image surface such as a predetermined format 35 is placed on a support 62 for the original image which is movable in synchronism with the laser exposure, and illuminated by an exposure lamp 17 for the format 35. The thus illuminated original is reflected toward an original image forming lens 33 by a mirror 60. Thereafter, the original image is directed to a second exposure position by mirrors 63 and 64 so as to be projected on the photosensitive drum 8. Thus, the laser image in the first exposure and the original image in the second exposure are synthesized on the photosensitive drum 8.

Where there is no extraneous signal and the copying of an original image alone is to be conducted, only the second exposure for the original image occurs, and no first exposure is carried out. On the other hand, where extraneous information alone is to be recorded, exposure of the original image is omitted and, instead, overall irradiation of the photosensitive drum 8 is carried out by means of an overall exposure lamp 65 at the second exposure position. Although, in the present embodiment, the overall exposure lamp 65 has been provided for accomplishing the overall irradiation, it may be done alternatively by causing the light of the original exposure lamp to be reflected by a reflecting surface provided on the original image support 62 at its rest position.

The printing section in FIGS. 18 and 19 will now be explained. The electrophotographic process applicable to the present invention is as follows. That is, the surface of the insulative layer of the electrophotosensitive drum 8 basically comprising an electrically conductive substrate, a photoconductive layer, and an electrically insulative layer which is, in advance, subjected to uniform primary charge in either the positive or the negative polarity by a first corona charger 9 to capture charges in opposite polarity to that of the primary charge at the interface between the photoconductive layer and the insulating layer or, in the interior of the photoconductive layer. Then, the laser beam 12 is irradiated onto the surface of the charged insulating layer. On the other hand, the insulating layer surface is subjected to AC corona discharge, or secondary discharge in opposite polarity to that of the primary charge, by the use of a second corona discharger 10, simultaneously with, or prior to, or subsequent to, the laser beam irradiation. Thereafter, the insulating layer surface is exposed to the positive image of the original image light 73, by the light stimulus of which a surface potential difference is created between the portion of the photosensitive medium exposed to the laser beam as well as the dark areas of the original image and the remaining portion of the photosensitive drum to thereby form a synthesized electrostatic image. This synthesized image is then developed into a visible image by developing means 13 using a developer chiefly composed of charged toner particles, after which the visible image is transferred onto paper or other appropriate transfer medium 11 by utilization of a further corona discharger 76. The thus transferred image is fixed by fixing means 46 such as an infrared ray lamp or hot plate to obtain an electrophotographically printed image 47.

On the other hand, the insulating layer surface after the image transfer is cleaned by cleaning means 48 to remove any residual charged particles to make the photosensitive drum 8 ready for reuse. Formation and development of the electrostatic latent image are similar to those in the previously described embodiments.

Figures 20A, 20B:
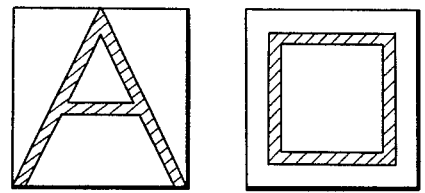
FIGS. 20(a) through 22(d) inclusive show various forms of the first and the second exposed image as synthesized.
Figures 22A, 22B:
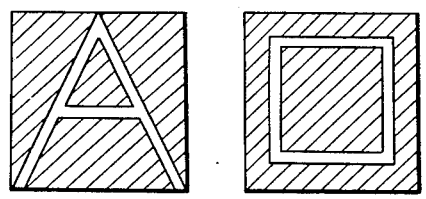
Figures 21C, 21D:
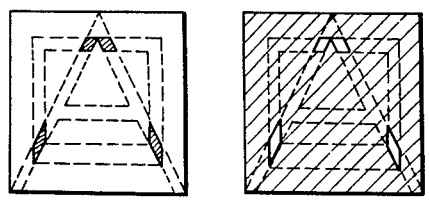
Figures 22C, 22D:
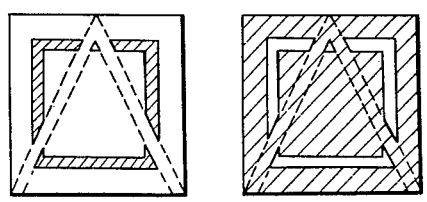
Figure 23:
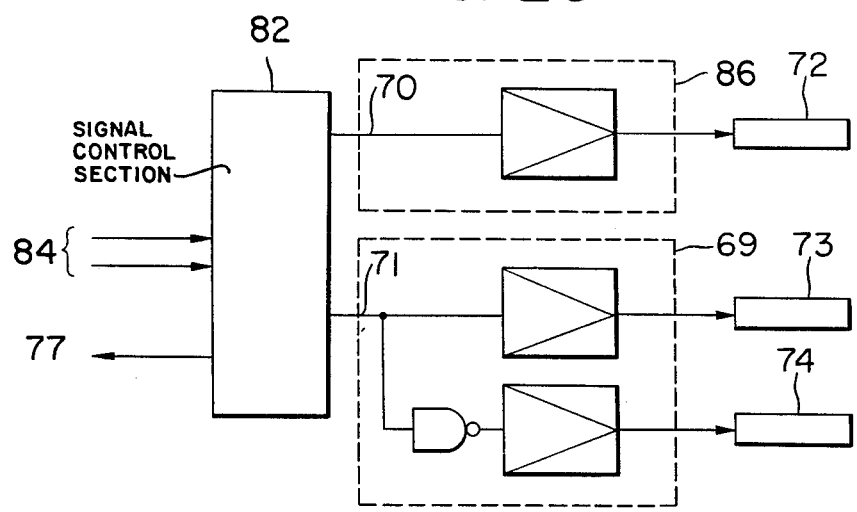
FIG. 23 shows a block diagram of an arrangement for controlling the images synthesis shown in FIGS. 20(a) through 22(d)

By the above-described electrophotographic process, a first exposure image by the laser beam (FIGS. 17(a), 20(a), 21(a) and 22(a)) and a second exposure image by the finite format original (FIGS. 17(b), 20(b), and 22(b)) are synthesized in the manner as shown in FIGS. 16(a) to 16(i), and FIGS. 20 to 23. The thus synthesized image, when developed by the use of a toner of opposite polarity to that of the primary charge, will represent the form as shown in FIGS. 17(d), 20(d), 21(d) and 22(d). When the same synthesized image is developed by the use of a toner in the polarity as that of the primary charge, the developed image will represent the form as shown in FIGS. 17(c), 20(c), 21(c) and 22(c). The hatch-lined portions in FIGS. 17(a), 20(a), 21(a) and 22(a) and FIGS. 17(b), 20(b), 21(b) and 22(b) represent dark areas, hence it is usually in the system of FIG. 17 that the image synthesis actually takes place. In the system of FIG. 17, when the first exposure for the laser beam is not effected, but only the second exposure for the original image is conducted, there will be obtained a reproduced image. Also, when the first exposure is carried out and then the second exposure follows by the overall irradation, there will be produced only a recorded image due to the extraneous signal. The control for these exposure operations may be done by a print control section shown in the block diagram of FIG. 23. In FIG. 23, the signal control section 82 processes extraneous input signals 84 and delivers instruction signals 70 and 71 to a first exposure control portion 86 and a second exposure control portion 69, respectively. In accordance with these signals, the first exposure 72, the second exposure, namely, the original image exposure, 73, and the overall exposure 74 are controlled.

Figure 24:
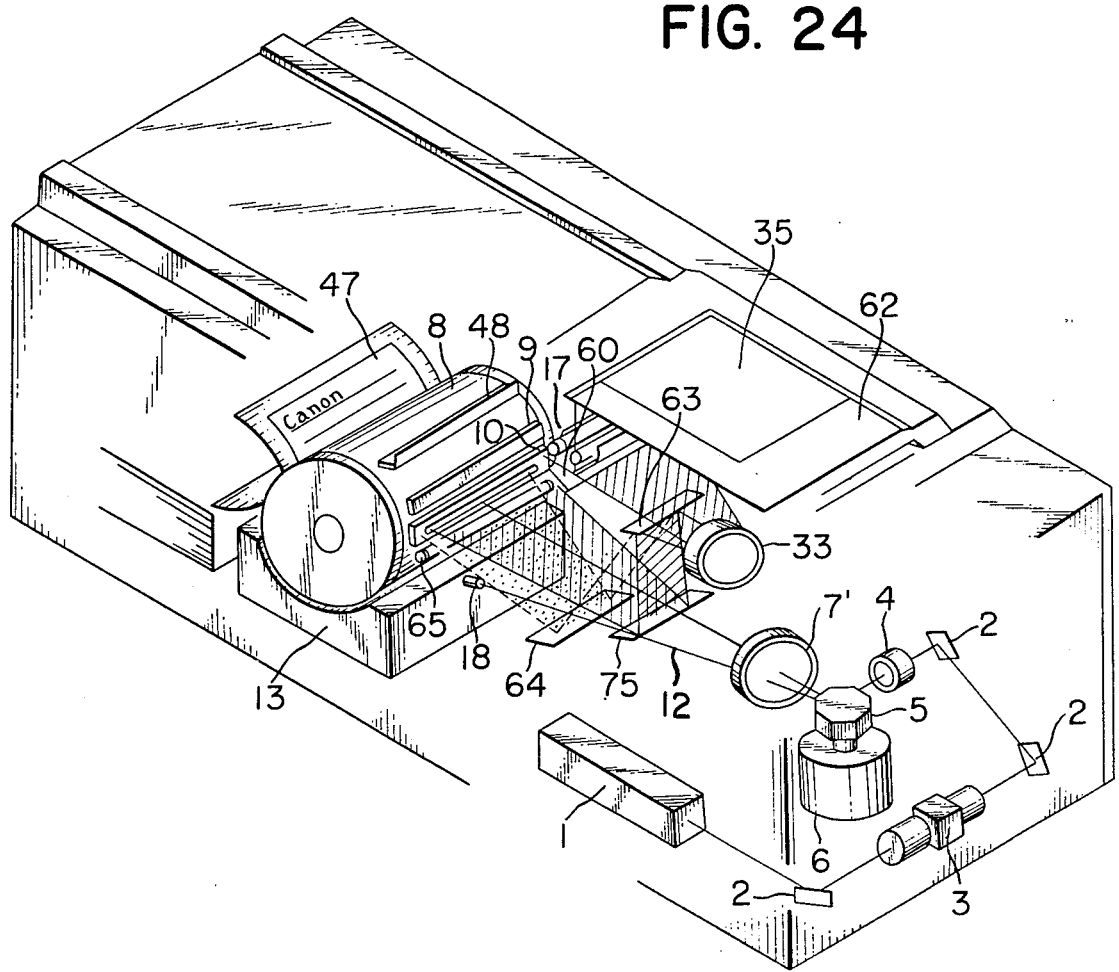

A further embodiment of the present invention is illustrated in FIGS. 24 and 25. This embodiment, in addition to the various means in the previous embodiment, has means for changing over the original image between the first and the second exposures, by which the synthesized recording as well as the inverted reproduction have been made possible by a single apparatus.

In FIGS. 24 and 25, the image of a predetermined format 35 is directed by a light path change-over mirror 63 into one of stationary mirrors 75 and 64, and selected at either a first exposure position or a second exposure position so as to expose a photosensitive drum 8. This change-over means enables a positive or an inverted image to be obtained readily. Since the synthesis of the laser light image and the original image by the first and the second exposures has already been described with respect to the previous embodiment, the synthesis of the image with the first exposure will now be described by reference to FIGS. 26(a) through 28(d). FIGS. 26(a), 27(a) and 28(a), and FIGS. 26(b), 27(b) and 28(b) indicate either one of the laser light image and the original image. When the two images (a) and (b) are simultaneously irradiated, subjected to the overall exposure at the second exposure position, and are developed, there will be obtained a synthesized image as shown in FIGS. 26(c), 27(c), 28(c) and FIGS. 26(d), 27(d) and 28(d), wherein the image (c) is resulted from the positive development while the image (d) is resulted from the inversion development. The system of FIG. 28 is usual.

When the image shown in FIG. 28(b) is made a developed image, and compared with that shown in FIG. 17(b), it will be apparent that positive synthesis or inverted synthesis, and reproduction can be accomplished easily by changing over the exposure position, even in case the same developer is used.

It will thus be appreciated that the present invention provides a novel and epoch-making apparatus which can easily accomplish, at high speed with high quality the image recording, synthesis, and reproduction without using any additional expedient.

Further, when the inversion development is to be carried out in the method of the present invention for overlaying the light beam image and the original image at the first exposure position, the original image to be overlaid must be a negative image.

It is also possible to obtain a negative copy from a positive original image through the inversion development by taking advantage of the function of the present apparatus as a reproduction machine. Such negative copies may be used as the originals to be overlaid on the light beam image. In the past, production of the negative copies had to be relied on experts in the field which was very inconvenient. According to the above-illustrated embodiments of the present invention, however, it is possible to obtain very eadily the image records for overlaying purpose from ordinary positive originals by a single apparatus.

Although, in the foregoing, the present invention has been explained in detail in reference to several preferred embodiments, it should be understood that these embodiments are merely illustrative and not restrictive, and that any change and modification may be made in so far as they do not deviate from the spirit and scope of the present invention as recited in the appended claims.

What is claimed is:

1. An image information recording apparatus, in which a modulated light beam formed in accordance with an information signal is utilized to effect recording on a recording medium, said apparatus comprising:
   a plurality of light beam forming means;
   a single modulator means for modulating at least one light beam from its associated light beam forming means in response to an image information signal;
   means for producing a combined electrical image information signal of a first image information signal and a second image information signal, and for applying the thus combined electrical signal to said modulator;
   image-forming lens means for focussing the modulated light beam upon said recording medium;
   means for sensitizing the recording medium; and
   means for causing the modulated light beam to scan over the recording medium.

2. An apparatus according to claim 1, wherein said first and second image information signals are electrical signals produced by different signal sources.

3. An apparatus according to claim 2, wherein said combined electrical image information signal is produced by adding the electrical signal for said first image information signal and the electrical signal for said second information signal.

4. An apparatus according to claim 2, wherein said combined electrical image information signal is produced by adding the electrical signal for said first image information signal and the electrical signal for said second information signal with modification of the amplitude of one of said electrical signals.

5. An apparatus according to claim 2, wherein said combined electrical image information signal is formed by combining the electrical signal for said first image information signal and the electrical signal for said second image information after inverting one of the electrical signals.

6. An apparatus according to claim 1, wherein said first image information signal is an electrical signal representing character or pattern information, and said second information signal is an electrical signal representing format information.

7. An image information recording apparatus, in which a light beam is modulated by an informational signal for recording on a recording medium, said apparatus comprising:
   a plurality of light beam forming means;
   modulator means for modulating at least one light beam from its associated light beam forming means in response to an image information signal;
   means for synchronously deflecting at least one unmodulated light beam from its associated light beam forming means and the light beam modulated by said modulator means;
   carrier means for applying additional information to said unmodulated and deflected light beam;
   means for converting said additional information into an information signal and applying said information signal as an input, in overlaid relationship, with said image information signal to said modulator means; and
   optical means for focussing said modulated light beam upon the recording medium to produce an image thereon.

8. An image information recording apparatus according to claim 7, wherein said plurality of light beam forming means includes a laser oscillator and means for splitting the laser beam formed by said laser beam oscillator.

9. An apparatus according to claim 7, wherein said modulator means comprises a single modulator for forming a modulated light beam in accordance with an image information signal.

10. An apparatus according to claim 9, wherein said modulator is an acousto-optic modulator element.

11. An apparatus according to claim 9, wherein said modulator is an electro-optic modulator element.

12. An apparatus according to claim 9, wherein said modulator comprises a modulator element which is provided along the light path of at least one beam from said plurality of light beam forming means.

13. An apparatus according to claim 7 further comprising a position detecting means to set the position for the modulated light beam to commence recording on the recording medium.

14. An apparatus according to claim 7, wherein said optical means comprises a lens having a focal length $f$ that conforms to the relationship $r = f \cdot \theta$, where $\theta$ is the angle between the light beam and an optical axis of the lens, and $r$ is the length between the optical axis and focussing position on the recording medium.

15. An apparatus according to claim 7, wherein said reflecting means comprises a polygon mirror.

16. An apparatus according to claim 7, wherein said deflecting means comprises a galvano-mirror.

17. An apparatus according to claim 7, further comprising a photosensitive member consisting essentially of an insulating layer, a photoconductive layer and an electrically conductive base, wherein said photosensitive member is the recording medium on which the modulated light beam is recorded.

18. An apparatus according to claim 17, further comprising:
   means for uniformly applying a first charge on a surface of said photosensitive member;
   means for simultaneously applying a second charge onto the surface of said charged photosensitive member and exposing said charged photosensitive member to said modulated light beam; and
   means for forming a high contrast electrostatic latent image on the surface of said photosensitive member by uniformly irradiating the whole surface of said photosensitive member.

19. An apparatus according to claim 18, further comprising:
   developing means for visualizing the electrostatic latent image;
   means for transferring the visualized image onto copying material; and
   cleaning means for removing residual developer from the surface of said photosensitive member.

20. An apparatus according to claim 18, wherein said second charge applying means is a DC corona discharger for applying a direct current corona discharge.

21. An apparatus according to claim 18, wherein said second charge applying means is an AC corona discharger for applying an alternating current discharge.

22. An image information recording apparatus according to claim 25, wherein said plurality of light beam forming means includes a laser oscillator and means for splitting the laser beam formed by said laser beam oscillator.

23. An apparatus according to claim 22, further comprising a recording medium having a photoconductive layer consisting essentially of cadmium sulfide (CdS), wherein said recording medium is the recording medium on which the modulated light beam is recorded, and wherein said laser oscillator is an He-NE gas laser oscillator.

24. An image information recording apparatus, in which a light beam is modulated by an information signal for recording on a recording medium, said apparatus comprising:
   first and second light beam forming means including a beam splitter;
   modulator means capable of modulating the light beam from said first light beam forming means in response to a first image information signal;
   means for synchronously deflecting said first and second light beams;
   a second image information carrier to be scanned by the second light beam deflected by said deflector means;
   means for overlaying a signal from said second image information carrier upon a signal of said first image information and applying said overlayed signals to said modulator means; and
   image-forming lens means for focussing upon the recording medium the modulated first light beam.

25. An image information recording apparatus according to claim 24, wherein said deflector means deflects said first and second light beams by a common mirror surface.

26. An apparatus according to claim 25, wherein said deflecting means comprises a polygon mirror.

27. An image information recording apparatus comprising:

a recording medium;
a plurality of light beam forming means;
modulator means for modulating at least one light beam from its associated light beam forming means in response to an image information signal;
means for synchronously deflecting at least one unmodulated light beam from its associated light beam forming means and the light beam modulated by said modulator means;
optical means for focussing the modulated and deflected light beam onto said recording medium to produce an image thereon;
means for producing a first electrical information signal;
means for producing a second electrical information signal by applying said unmodulated and deflected light beam to a second information carrier and converting the second information to an electrical signal;
means for combining said first electrical information signal with said second electrical information signal and for applying both electrical information signals simultaneously in overlaid relationship to said modulator means as the image information signal to form the modulated light beam.

28. An image information handling system comprising:
means for forming a modulated light beam in accordance with an image information signal;
means for forming an unmodulated light beam;
means for synchronously deflecting said modulated light beam and said unmodulated light beam;
a first information carrier;
means for optically reading out first image information from said information carrier by applying said unmodulated light beam thereto and for producing an electrical signal corresponding to said first information;
a second electrical information signal producing means; and
means for electrically combining said first electrical signal from said reading out means with the second electrical information signal in overlaid relationship to form a combined signal and applying the thus combined information signal to said modulated light beam forming means as the image information signal to form the modulated light beam in accordance therewith.

29. An image information recording system in which a modulated light beam formed in accordance with an information signal is utilized to effect recording on a recording medium, said system comprising:
means for forming a modulated light beam in accordance with the information signal, said means having a single modulator which effects modulation in response to combined electrical image information signals applied thereto;
means for forming an unmodulated light beam;
means for deflecting said modulated light beam and said unmodulated light beam;
means for producing first image information signals in response to said deflected unmodulated light beam;
means for producing second image information signals;
means for electrically combining said first and second image information signals in overlaid relationship and applying said overlaid information signals to said modulator; and
image-forming optical means for focussing the modulated light beam upon the recording medium.

* * * * *

UNITED STATES PATENT OFFICE
CERTIFICATE OF CORRECTION

Patent No. 4,122,462           Dated   October 24, 1978

Inventor(s)    KAZUHIRO HIRAYAMA ET AL

It is certified that error appears in the above-identified patent and that said Letters Patent are hereby corrected as shown below:

Column 1, line 50, "change" should read --changed--;

Column 3, line 13, "souce" should read --source--;

Column 6, line 4, insert --and-- before "delivered";

Column 6, line 59, insert --an-- before "electrophotographic";

Column 7, line 5, insert --corresponding to U.S. Patent No. 3,666,363-- after "1967";

Column 7, line 44, "method" should read --methods--;

Column 7, line 52, delete "of" before "the";

Column 7, line 61, insert --the-- after "that";

Column 10, line 45, "beam" should read --beams--;

Column 10, line 47, "lights" should read --light beams--;

Column 13, line 58, "beam" should read --beams--;

Column 17, line 59, insert --a-- before "major";

Column 18, line 41, "when" should read --When--;

UNITED STATES PATENT OFFICE
CERTIFICATE OF CORRECTION

Patent No. 4,122,462  Dated October 24, 1978

Inventor(s) KAZUHIRO HIRAYAMA ET AL

It is certified that error appears in the above-identified patent and that said Letters Patent are hereby corrected as shown below:

Column 21, line 10, insert --(21b)-- after "(20b)";

Column 21, line 29, "irradation" should read --irradiation--;

Column 22, line 26, "eadily" should read --easily--;

Claim 7, Column 23, line 13, "informational" should read --information--;

Claim 22, Column 24, line 30, "25" should read --18--.

Signed and Sealed this

Twentieth Day of February 1979

[SEAL]

Attest:

RUTH C. MASON
*Attesting Officer*

DONALD W. BANNER
*Commissioner of Patents and Trademarks*